(12) United States Patent
Zhou et al.

(10) Patent No.: US 6,690,846 B2
(45) Date of Patent: Feb. 10, 2004

(54) DISPERSION-COMPENSATED OPTICAL WAVELENGTH ROUTER

(75) Inventors: Gan Zhou, Plano, TX (US); Kuang-Yi Wu, Plano, TX (US)

(73) Assignee: Chorum Technologies LP, Richardson, TX (US)

( * ) Notice: Subject to any disclaimer, the term of this patent is extended or adjusted under 35 U.S.C. 154(b) by 261 days.

(21) Appl. No.: 09/798,659

(22) Filed: Mar. 1, 2001

(65) Prior Publication Data
US 2002/0122614 A1 Sep. 5, 2002

(51) Int. Cl.[7] .................................................. G02B 6/26
(52) U.S. Cl. ......................... 385/15; 385/127; 385/24; 385/31; 385/39; 359/127
(58) Field of Search ........................... 385/15, 18, 24, 385/27, 31–39; 359/127

(56) References Cited

U.S. PATENT DOCUMENTS

| | | | |
|---|---|---|---|
| 6,130,971 A | 10/2000 | Cao | |
| 6,144,494 A | 11/2000 | Shirasaki et al. | |
| 6,163,393 A | 12/2000 | Wu et al. | ................... 359/127 |
| 6,169,604 B1 | 1/2001 | Cao | |
| 6,169,626 B1 | 1/2001 | Chen et al. | |

*Primary Examiner*—Robert H. Kim
*Assistant Examiner*—George Y. Wang
(74) *Attorney, Agent, or Firm*—Baker Botts, L.L.P.

(57) ABSTRACT

An optical wavelength router separates an input signal into two complementary output signals. A beamsplitter of the wavelength router separates the input signal into a first beam and a second beam. A first resonator reflects the first beam producing a group delay that is dependent on wavelength. Similarly, a second resonator reflects the second beam. The center wavelength of the second resonator is offset relative to that of the first resonator by one half of the free spectral range of the first resonator, so that the resonance frequencies of the second resonator are matched to the anti-resonance frequencies of the first resonator. The beams reflected by the resonators interfere within the beamsplitter to produce two output signals containing complementary subsets of the spectrum of the input signal (e.g., even optical channels are routed to a first output port and the odd optical channels are routed to a second output port).

79 Claims, 14 Drawing Sheets

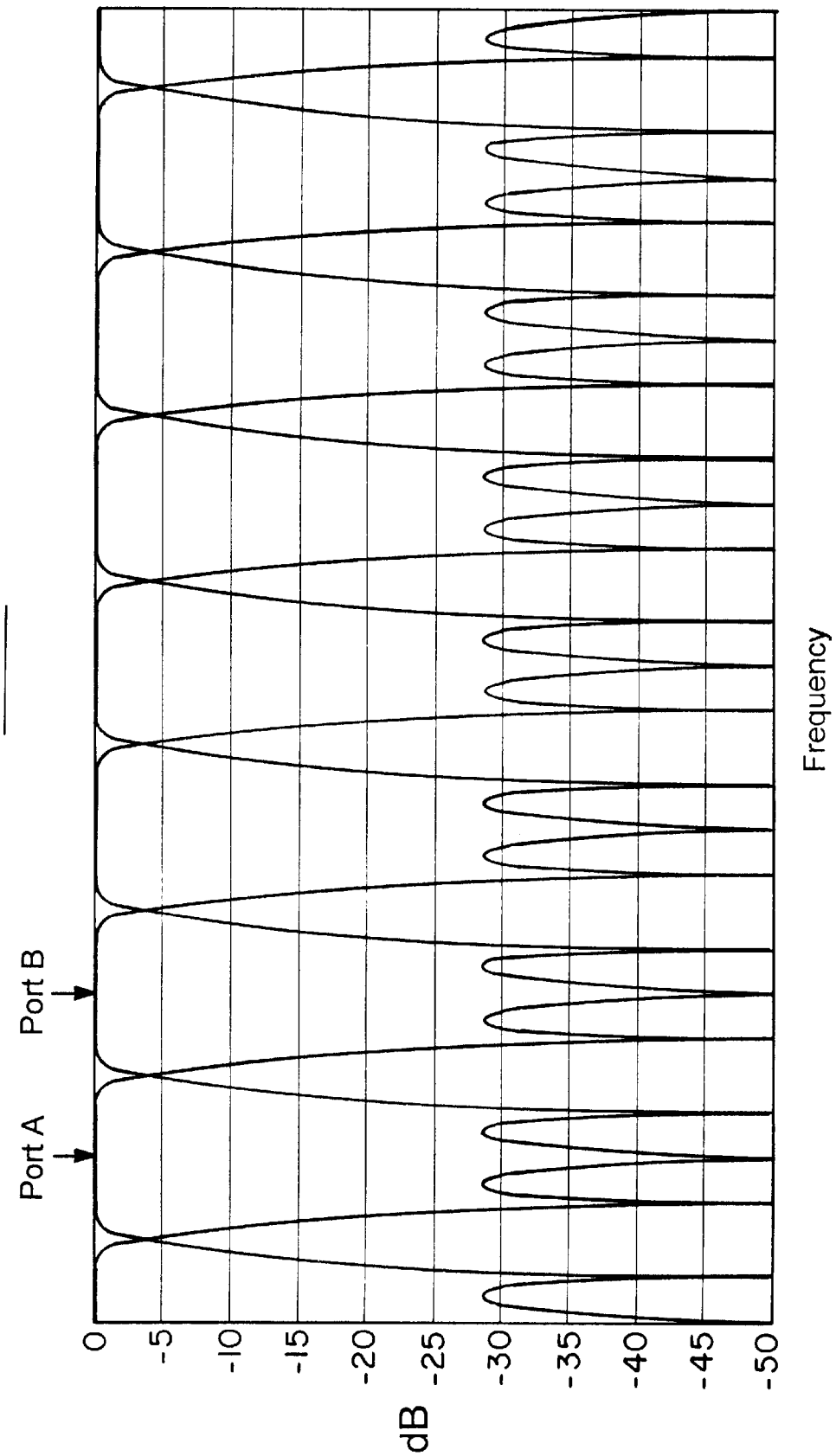

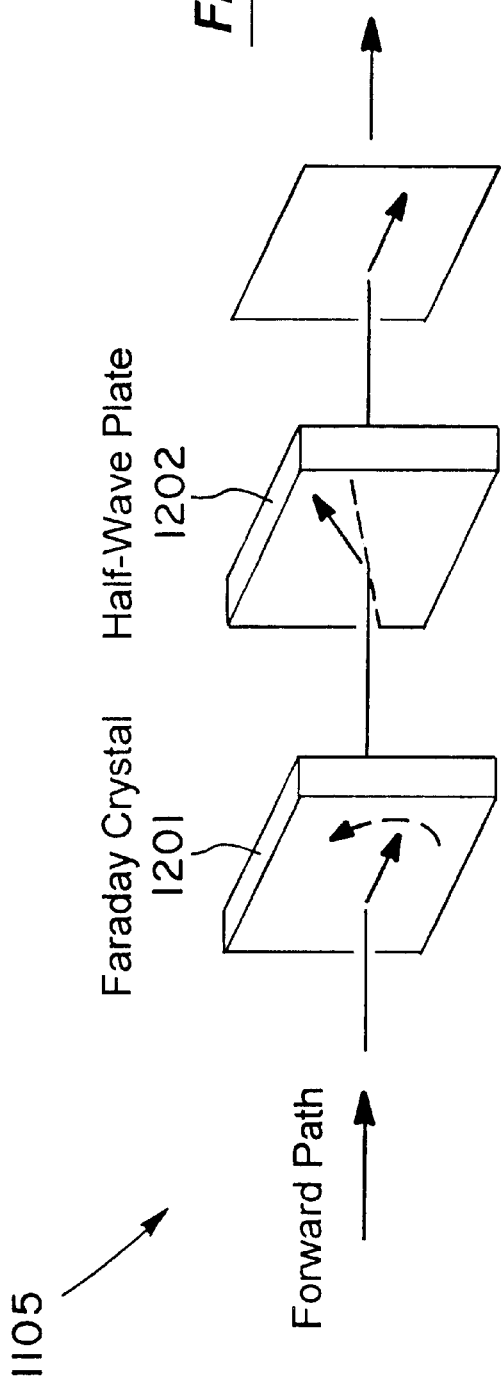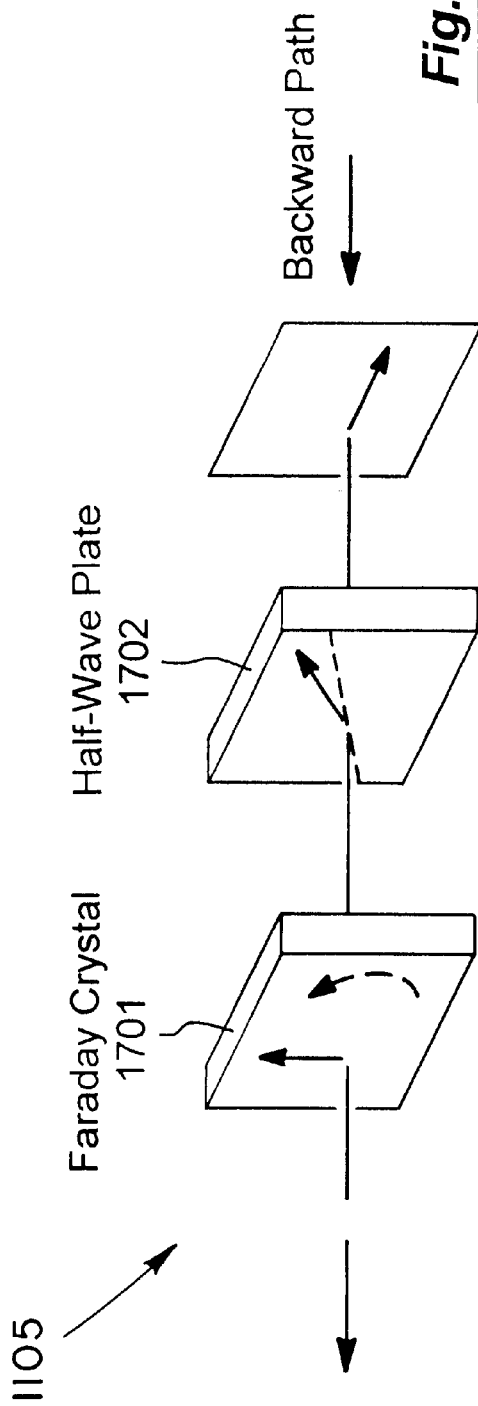

DISPERSION-COMPENSATED OPTICAL WAVELENGTH ROUTER

FIELD OF THE INVENTION

The present invention relates generally to the field of optical communications systems. More specifically, the present invention discloses a dispersion compensated optical wavelength router.

BACKGROUND OF THE INVENTION

Wavelength division multiplexing is a commonly used technique that allows the transport of multiple optical signals, each at a slightly different wavelength, over an optical fiber. The ability to carry multiple signals on a single fiber allows that fiber to carry a tremendous amount of traffic, including data, voice, and digital video signals. For example, the International Telecommunications Union (ITU) Draft Recommendation G.mcs proposes a frequency grid which specifies various channel spacings including 100 GHz and 200 GHz. It would be advantageous to obtain smaller channel spacings. As transmission systems evolve to longer distances, smaller channel spacings, and higher bit rates, however, the phenomenon of dispersion becomes a limiting factor.

SUMMARY OF THE INVENTION

One embodiment of the present invention is an optical wavelength router that includes a beamsplitter, a first resonator, and a second resonator. The beamsplitter separate an input signal into a first beam and a second beam. The first resonator has a first center wavelength and reflects the first beam. The second resonator has a second center wavelength and reflects the second beam. The second center wavelength is offset relative to the first center wavelength by approximately one half of the free spectral range of the first resonator such that the resonance frequencies of the second resonator are matched to the anti-resonance frequencies of the first resonator.

The following technical advantages may be achieved by some, none, or all of the embodiments of the present invention. The optical wavelength router performs a multiplexing and/or a demultiplexing function to generate output waveforms that have a flat-top passband, good isolation, and very low chromatic dispersion.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 illustrates an example of the spectral response of the optical wavelength router;

FIGS. 12A and 12B illustrate one embodiment of a Faraday rotator;

DETAILED DESCRIPTION OF THE INVENTION

Figure 1A:
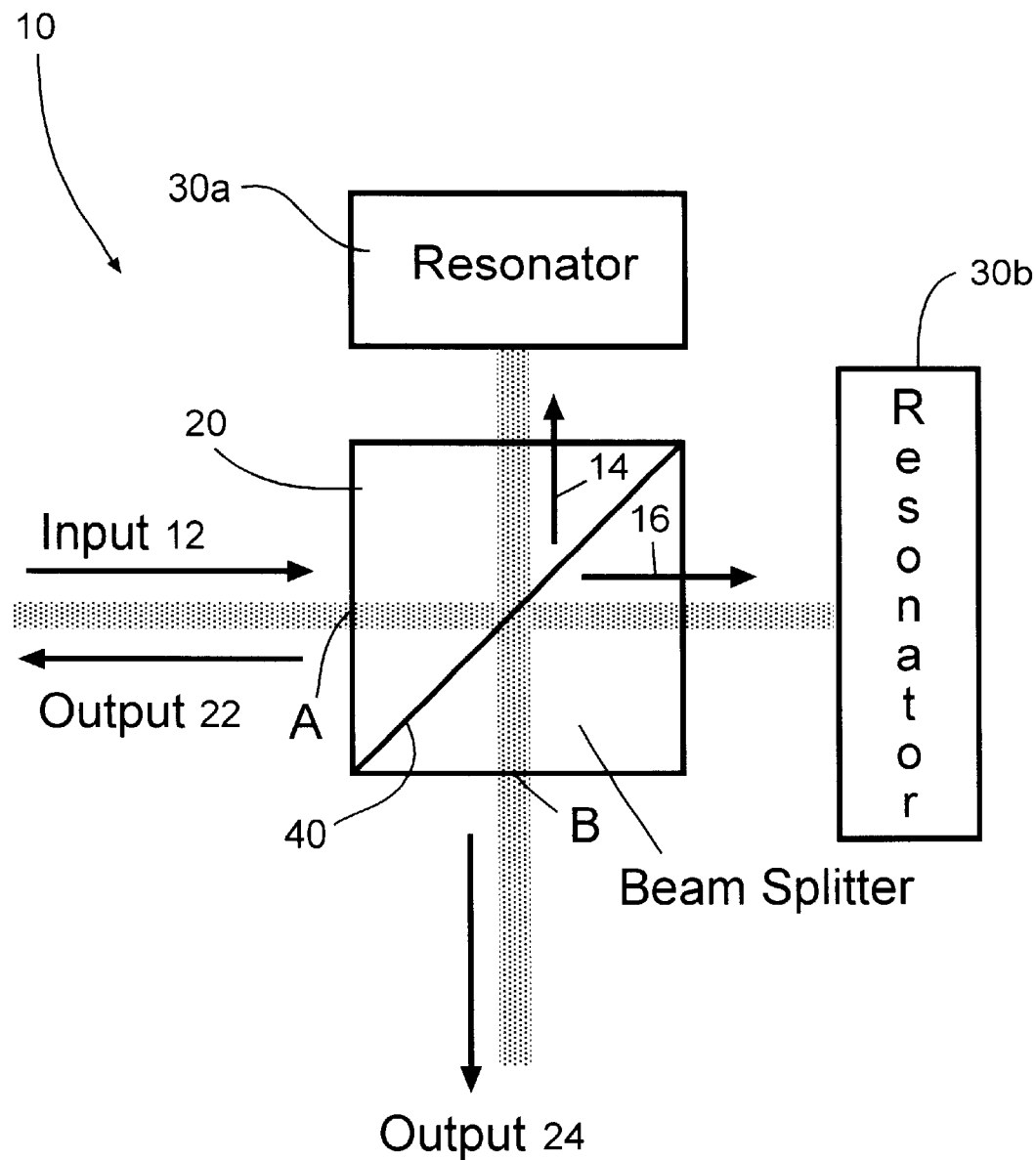
FIGS. 1A and 1B illustrate one embodiment of an optical wavelength router according to the present invention.

FIG. 1A illustrates one embodiment of an optical wavelength router 10 that includes a beamsplitter 20 and resonators 30a and 30b. Resonators 30a and 30b are collectively referred to as resonators 30. In general, router 10 performs a multiplexing function and/or a demultiplexing function and reduces the dispersion generally associated with performing these functions. When performing the multiplexing function, router 10 combines two streams of optical signals into a single, more densely spaced signal stream. The multiplexing function of router 10 is described in greater detail below. When performing the demultiplexing function, router 10 separates a dense signal stream into two, wider spaced streams. For example, beamsplitter 20 of router 10 receives an input signal 12 at an input port and splits signal 12 into a first beam 14 propagating along a first optical path and a second beam 16 propagating along a second optical path. The beams 14 and 16 propagating along each path are reflected back by the appropriate resonators 30a and 30b. The two reflected beams combine and interfere at the beamsplitter 20 to form a first output signal 22 and a second output signal 24. Output signal 22 back-propagates toward the input and exits at an output port A. Output signal 24 emerges from an output port B.

Input signal 12 comprises a WDM signal containing multiple optical channels to define an input spectral band. The outputs signals 22 and 24 emerging at output ports A and B contain two complementary subsets of the input spectral band such that, for example, output signal 22 comprises a WDM signal containing the even channels of the input spectral band and output signal 24 comprises a WDM signal containing the odd channels of the input spectral band. Therefore, alternating optical channels in the input spectral band are routed to each output port (e.g., even channels are routed to output port A, and odd channels are routed to output port B), as shown in the graph provided in FIG. 3. Router 10 therefore performs a demultiplexing function. If desired, this router 10 can be extended in a cascaded architecture with multiple stages of optical routers 10 to progressively separate individual channels or groups of channels. A description of a cascaded architecture is detailed with respect to FIG. 14.

For simplicity of discussion, beamsplitter 20 is illustrated in FIG. 1A as a non-polarizing beamsplitter cube. The beam splitting takes place at a surface 40, and the four outer surfaces of the beamsplitter 20 are coated with anti-reflection film. It should be noted that generally the beamsplitter 20 shown in FIG. 1A can either be polarization-based or non-polarizing. For example, the beamsplitter 20 can be a non-polarizing or polarizing thin film beamsplitter, a birefringent beam displacer, a diffractive optical element, or an optical coupler.

Figure 4A:
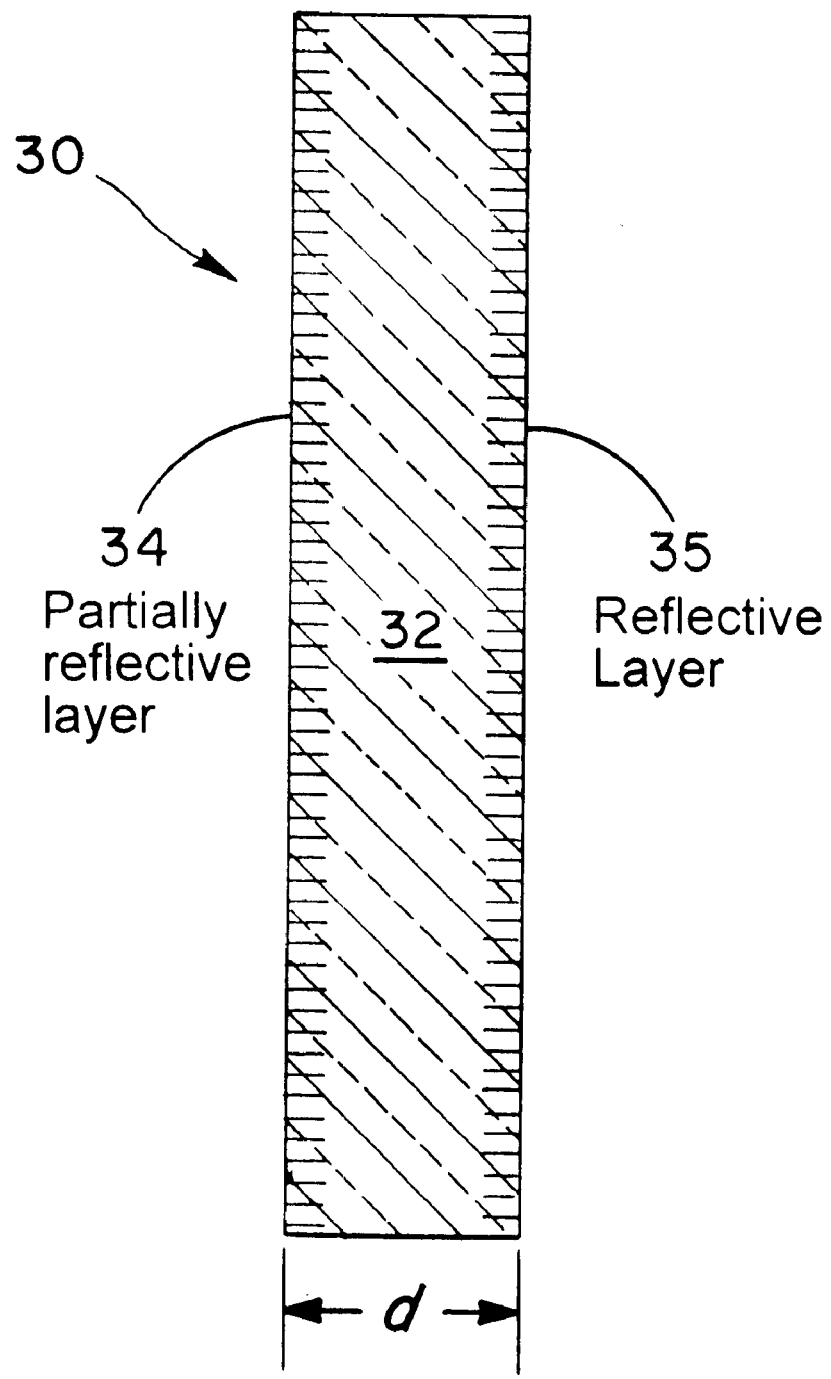
FIG. 4A illustrates one embodiment of a resonator that may be used in the optical wavelength router.
Figure 4B:
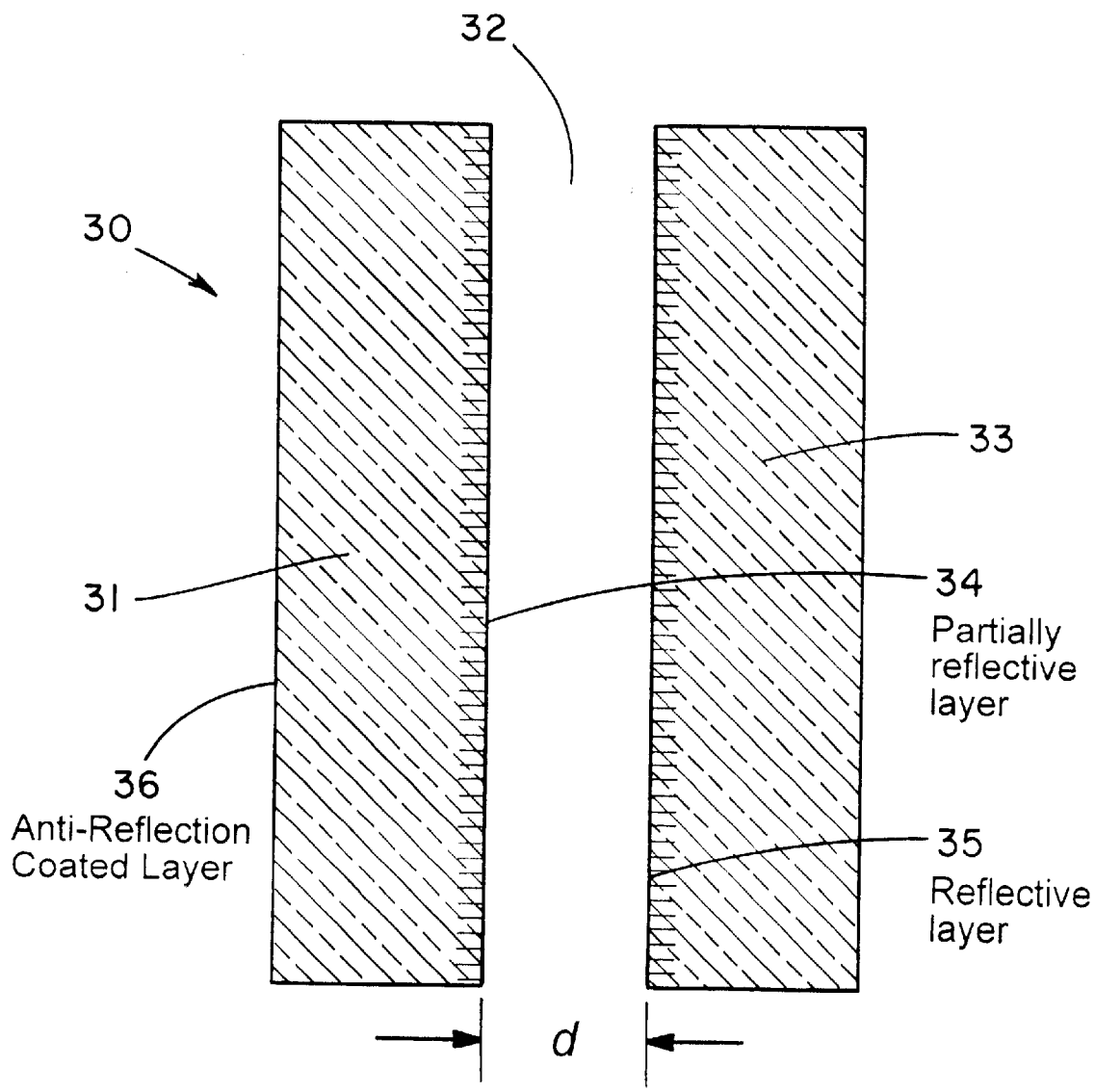
FIG. 4B illustrates another embodiment of a resonator using an air-gap structure.

Resonator 30 comprises a cavity with a partially reflective front surface and a totally reflective back surface, such as, for example, an etalon. FIGS. 4A and 4B illustrate examples of resonators 30 that may be used in router 10. It should be understood, however, that other types of resonators 30 may be used to achieve the unique features and functions of the present invention.

FIG. 4A illustrates one embodiment of a single cavity Gires-Tournois resonator having two mirror surfaces 34 and 35 separated by intermediate material 32. The surfaces 34 and 35 are parallel to each other. The front mirror 34 is partially reflective, while the back mirror 35 is highly reflective. Consistent with standard terminology in the art, the optical thickness, d, of a resonator 30 is defined as the physical thickness of the gap 32 multiplied by the refractive index of the intermediate material 32.

FIG. 4B illustrates another embodiment of a single cavity Gires-Tournois resonator having two mirror surfaces 34 and 35 parallel to each other and separated by an air gap 32. The layers 31 and 33 are transparent. The front surface 36 of the first layer 31 can be coated with anti-reflection film. Typically, the surface 36 also has a wedge angle relative to the mirror surfaces 34 and 35 to further reduce the effect of residual reflections from the surface 36. The optical thickness of the resonator here is the physical thickness of gap 32 multiplied by the refractive index of air. In general, the optical thickness of an object is equal to its physical thickness multiplied by the refractive index of the material forming the distance.

Returning to FIG. 1A, the optical thicknesses of the resonators 30a and 30b are referred to as d1 and d2, respectively. The amplitude reflectivities of the front mirrors of the resonators 30a and 30b are referred to as r1 and r2, respectively. The wavelength router 10 illustrated in FIG. 1A has two arms. The first arm traces the beam 14 propagation path toward resonator 30a and the second arm traces the beam 16 propagation path toward resonator 30b. For example, the first arm starts at the point of interception between the input beam 12 and surface 40 of beamsplitter 20. It includes the upper-left half of the beamsplitter 20, followed by the gap between the beamsplitter 20 and first resonator 30a, then the resonator 30a. The optical path length of the first arm is referred to as L1, and it is defined as the summation of the optical thicknesses of all the parts in this arm including the first resonator 30a. The optical path length of the second arm, L2, is defined similarly. The interferometer path length difference $\Delta L$ is defined as (L2−L1).

In operation of router 10 performing a demultiplexing function, beamsplitter 20 splits input signal 12 into beams 14 and 16. If the beamsplitter 20 is a polarization beamsplitter, beams 14 and 16 will have orthogonal polarizations. Beams 14 and 16 are directed onto resonators 30a and 30b, respectively. Each beam 14 and 16 striking the partially-reflective layer 34 of a resonator 30 is partially transmitted through the partially-reflective layer 34 into the resonator cavity 32, and is then reflected by the reflective layer 35 through the partially-reflective layer 34 toward the beamsplitter 20. A portion of the each beam 14 and 16 is also reflected back by the partially-reflective layer 34 along its optical path toward the beamsplitter 20 without propagating through a resonator 30. Each resonator 30 reflects substantially all of the incident optical power back regardless of wavelength, but the group delay of the reflected beams is strongly dependent on wavelength.

Both of the reflected beams from the resonators 30a and 30b back-propagate along their respective optical paths toward the beamsplitter 20, where they are combined and interfere to produce output signals 22 and 24 containing complementary subsets of the input spectral band. For example, output signal 22 comprises a first subset of the input spectral band, such as the even channels of input signal 12. In this example, output signal 24 comprises a second subset of the input spectral band complementary to the first subset, such as the odd channels of input signal 12. Output signal 22 emerges from router 10 at output port A while output signal 24 emerges from router 10 at output port B. Therefore, when performing the demultiplexing function, router 10 separates a dense signal 12 into two, wider spaced signals 22 and 24. Router 10 achieves low dispersion in this endeavor using resonators 30a and 30b.

Figure 1B:
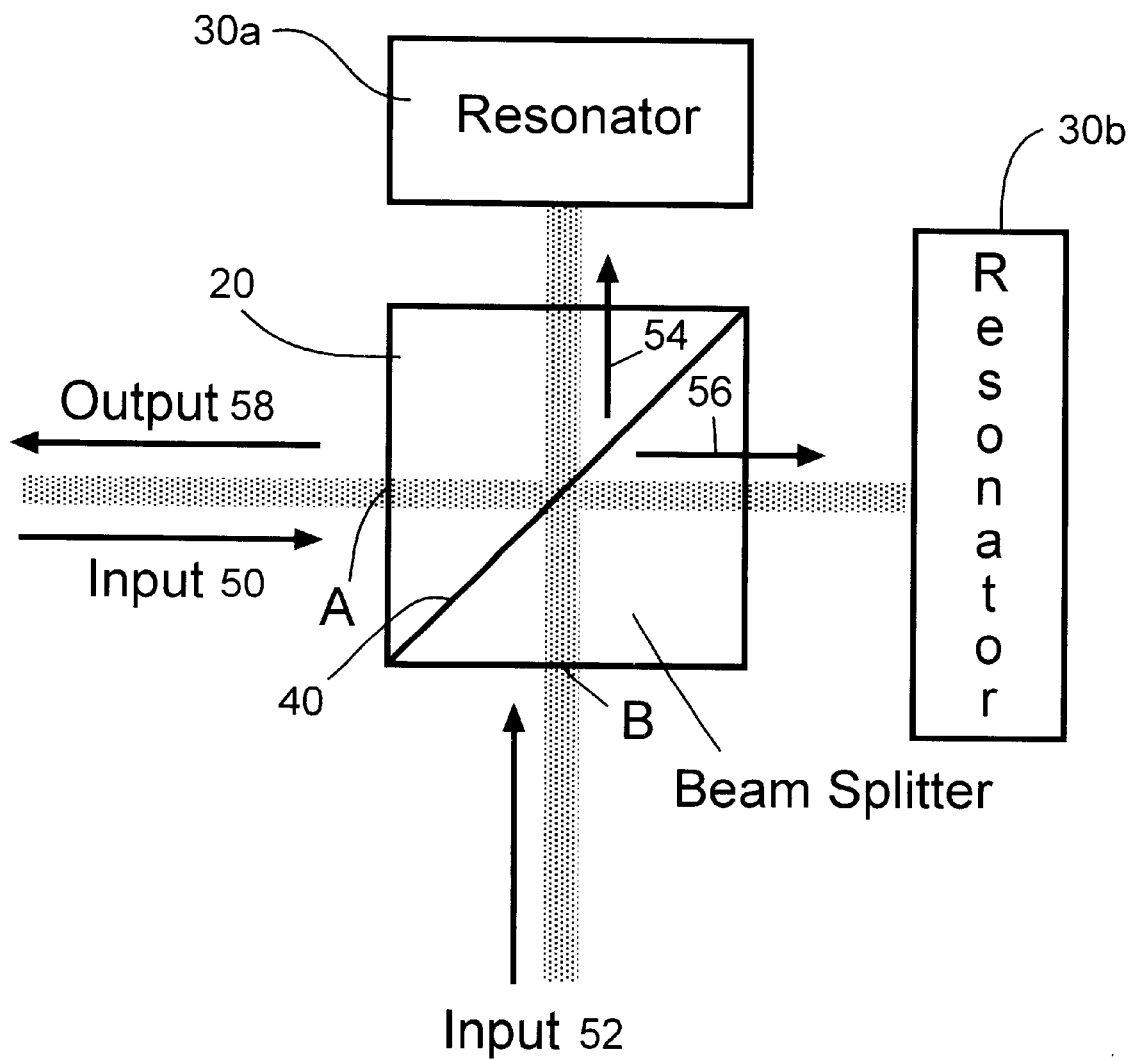

FIG. 1B illustrates the operation of router 10 performing a multiplexing function. Input signals 50 and 52 contain complementary subsets of an output spectral band. Beamsplifter 20 splits each input signal 50 and 52 into beams 54 and 56 which are directed onto resonators 30a and 30b, respectively. Beam 54 contains components of both signal 50 and signal 52. Similarly, beam 56 contains components of both signal 50 and signal 52. Each beam 54 and 56 striking the partially-reflective layer 34 of a resonator 30 is partially transmitted through the partially-reflective layer 34 into the resonator cavity 32, and is then reflected by the reflective layer 35 through the partially-reflective layer 34 toward the beamsplitter 20. A portion of each beam 54 and 56 is also reflected back by the partially-reflective layer 34 along its optical path toward the beamsplifter 20 without propagating through a resonator 30. Each resonator 30 reflects substantially all of the incident optical power back regardless of wavelength, but the group delay of the reflected beams is strongly dependent on wavelength.

Both of the reflected beams 54 and 56 from the resonators 30a and 30b back-propagate along their respective optical paths toward the beamsplitter 20, where they are combined and interfere to produce output signal 58. Output signal 58 generally defines an output spectral band comprising each of the complementary subsets of channels in input signals 50 and 52. Therefore, when performing the multiplexing function, router 10 combines two streams of optical signals 50 and 52 into a single, more densely spaced signal stream 58. Router 10 achieves low dispersion in this endeavor using resonators 30a and 30b.

Figure 2:
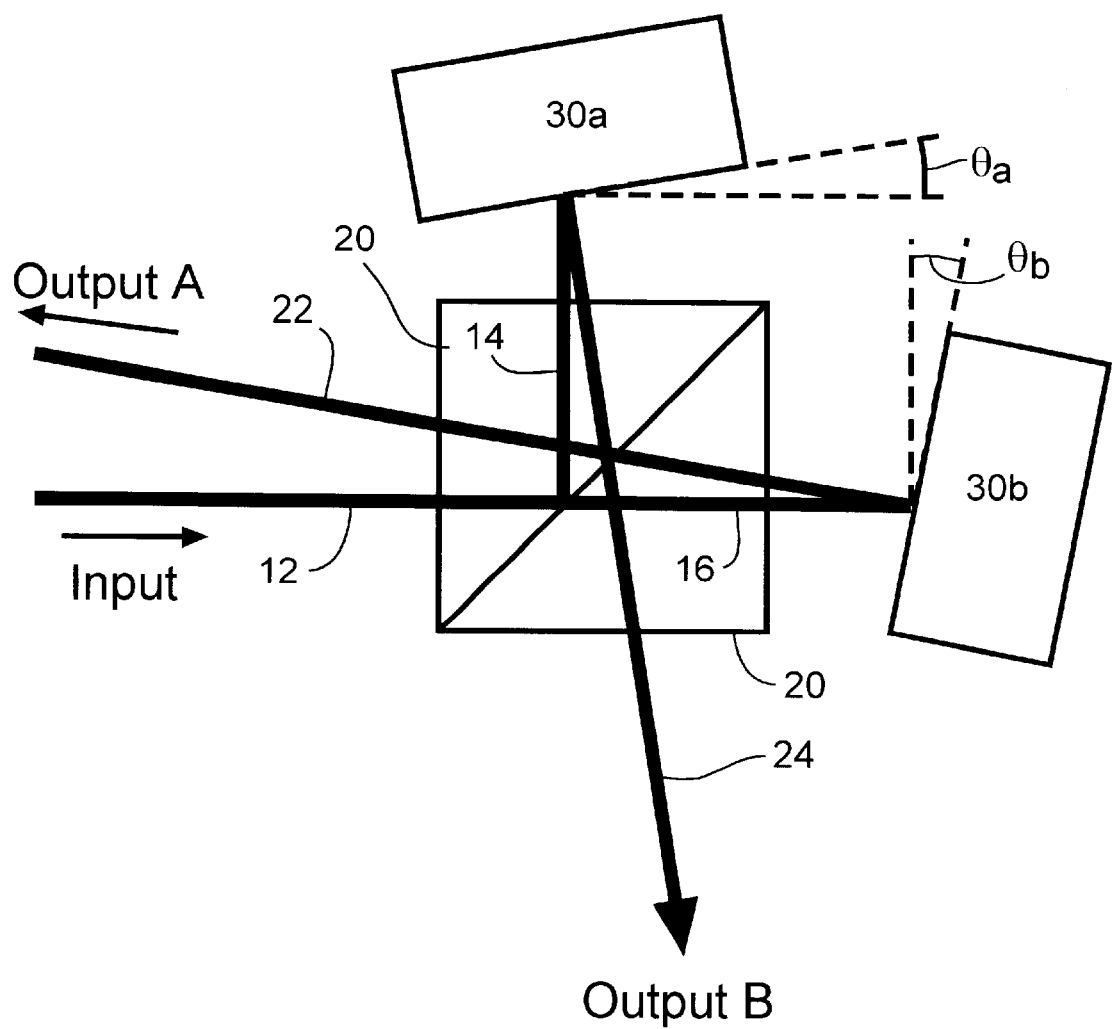
FIG. 2 illustrates the optical wavelength router arranged in a tilted configuration.

FIG. 2 illustrates the optical wavelength router 10 of FIG. 1A in a tilted configuration. In particular, resonator 30a is arranged at a bias angle $\Theta_a$ with respect to the normal of the optical path of beam 14. Resonator 30b is arranged at a bias angle $\Theta_b$ with respect to the normal of the optical path of beam 16. In general, $\Theta_a$ and $\Theta_b$ are each set at an angle from 0.5 to 10 degrees to achieve an appropriate tilt configuration of resonators 30. In a particular embodiment, $\Theta_a$ and $\Theta_b$ are each set at approximately the same angle. In operation, each of beams 14 and 16 reflected by resonators 30a and 30b, respectively, propagates toward beamsplitter 20 along an optical path that is offset from its original optical path toward resonators 30a and 30b. As a result, optical signals 22 and 24 emitted by router 10 are isolated from input signal 12. It should be understood that the tilt configuration of resonators 30a and 30b is not limited to that illustrated in FIG. 2. Rather, any tilt configuration of resonators 30a and 30b suitable to isolate output signals 22 and 24 from input signal 12 is contemplated. Moreover, router 10 illustrated in FIG. 2 may also be operated in a multiplexing function, as described above with regard to FIG. 1B, while still achieving isolation of input and output signals and low dispersion.

Figure 5:
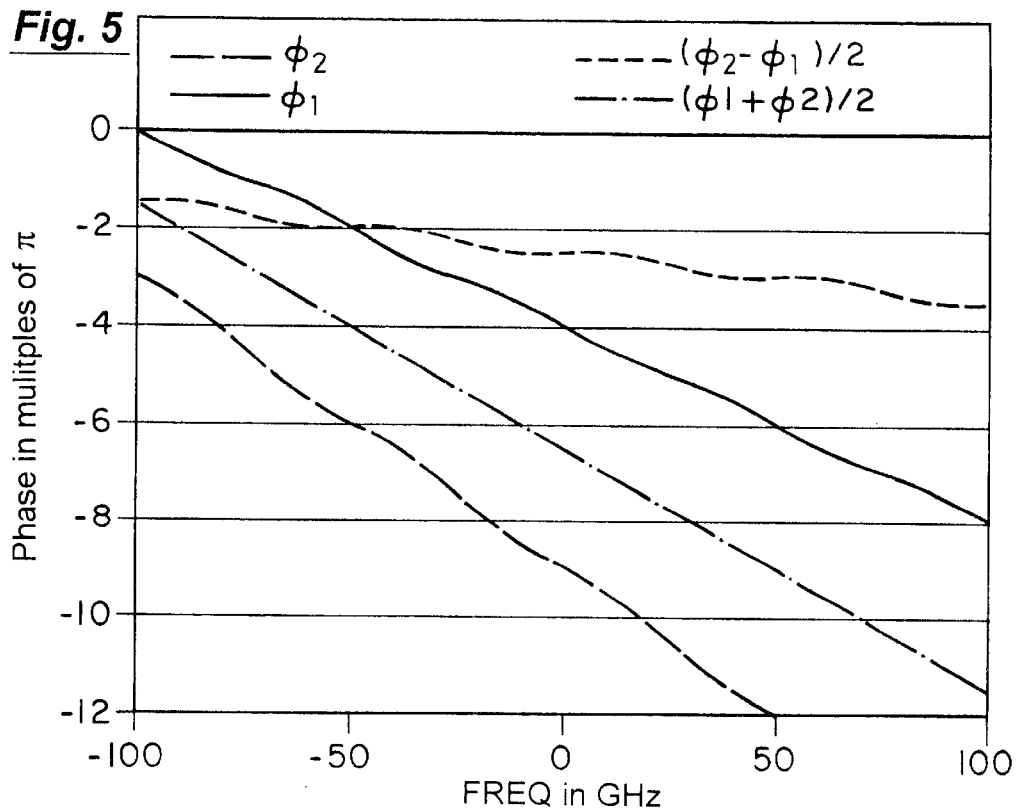
FIG. 5 illustrates the phase functions for the two arms of the optical wavelength router.
Figure 6:
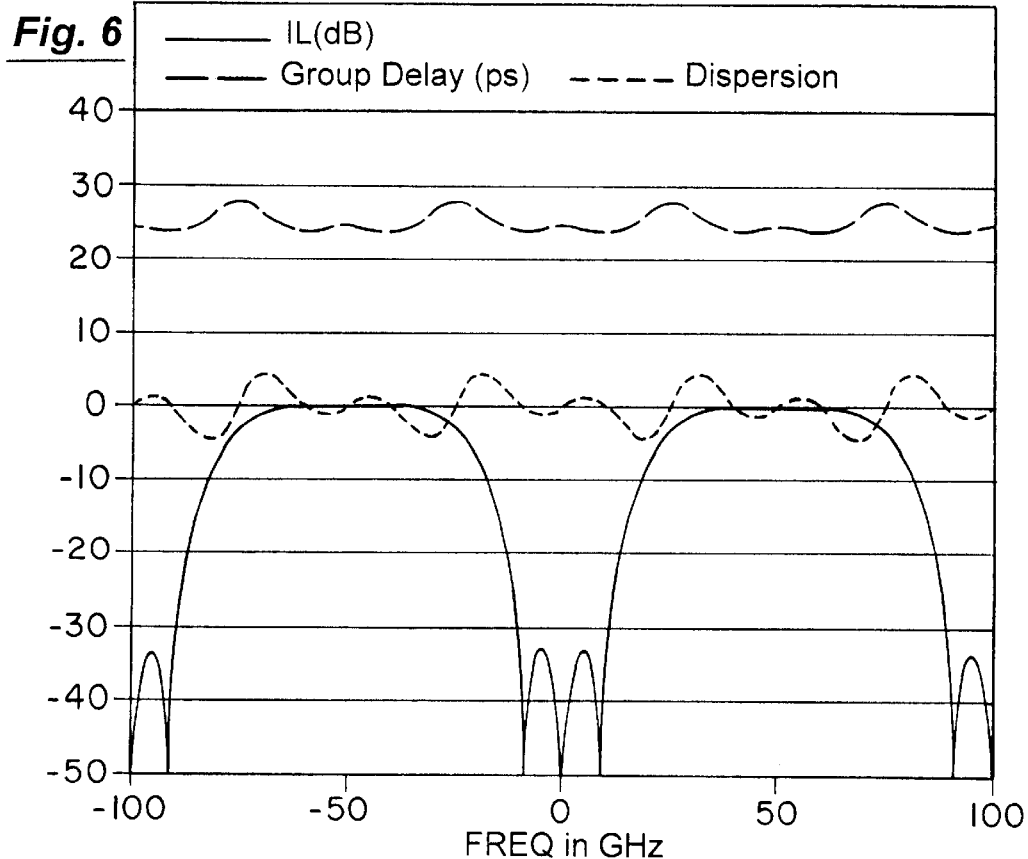
FIG. 6 illustrates the waveform, group delay, and dispersion of the optical wavelength router.

FIGS. 5 and 6 illustrate the performance characteristics of wavelength router 10. This example demonstrates the construction of a low-dispersion, 50 GHz optical demultiplexer (i.e., the input channels are spaced 50 GHz apart, and the output channels are 100 GHz apart). First, the optical thickness d2 of resonator 30b is selected so that resonator 30b has a free spectral range (FSR) of approximately 50 GHz and the resonance frequencies are at $f_c$, +/−25 GHz. Here $f_c$ denotes the center frequencies of the WDM channels of input signal 12 that are spaced, for example, 50 GHz apart. The FSR of resonator 30b here is defined as the period of the resonator's complex reflectivity.

The above conditions are achieved by following the equation:

$$d2=(m/2)*\lambda_c+(¼)*\lambda_c$$

and picking the integer m such that the equation:

$$d2=c/(2*FSR)$$

is satisfied to best approximation. Here $\lambda_c$ is the center wavelength of any one of the input channels within the FSR of the particular resonator 30; and c is the speed of light in a vacuum. In a particular embodiment, $\lambda_c$ is the center wavelength of the center input channels within the FSR of the particular resonator 30. In an example for a c-band 50 GHz router 10, we can use $\lambda_c=1545.32$ nm, $c=2.99792458*10^8$ m/sec, and therefore d2=2.998307 mm. The optical thickness d1 of resonator 30a is set such that $d1=d2+/-(¼)*\lambda_c$. In the example where $d1=d2-(¼)*\lambda_c$, d1=2.997921 mm.

By following the procedure above, the center wavelength of the resonator 30a is offset relative to the center wavelength of the resonator 30b by approximately one half of the free spectral range of both the resonators. For example, if the free spectral range of both resonators is approximately 50 GHz, then the center wavelength of resonator 30a is offset by approximately 25 GHz relative to the center wavelength of resonator 30b. This causes the resonance frequencies of the resonator 30a to match that of the anti-resonance frequencies of resonator 30b. As will be elaborated further below, this arrangement of the resonators' center wavelengths can significantly reduce chromatic dispersion in the device, while keeping a flat-top passband and good isolation.

The back mirror reflectivities of the two resonators 30 are both set to be 100%. The front mirror reflectivities of the resonators 30 can be varied to adjust the passband, isolation, and dispersion of the interleaver waveform. In the example of FIG. 5 and FIG. 6 the front mirror reflectivities are set at r2=0.2 (i.e., 4% reflectivity) and r1=0.12 (i.e., 1.44% reflectivity). Finally, the interferometer path length difference, ΔL, is set to be approximately (½)*d2, which comes out to ΔL≈1.499 mm.

Figure 7:
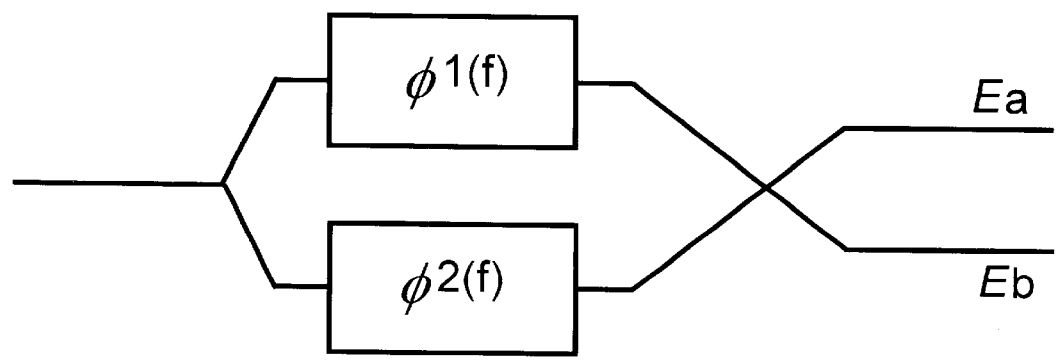
FIG. 7 illustrates a conceptual diagram of an interferometer.

A technical advantage of wavelength router 10 is its low dispersion. This can be most readily understood by comparison to a conventional Michelson interferometer in which an incoming optical beam is split 50/50 between two optical paths (e.g., by a beamsplitter), as shown in FIG. 7. The beam propagating along the first path experiences a phase shift, ϕ1(f). Similarly, the second beam experiences a phase shift, ϕ2(f). Note that f denotes the optical frequency, and that both the phase shift functions are frequency (or wavelength) dependent. The two output optical fields of the interferometer can be written as:

$$Ea=\exp(-i\phi1)+\exp(-i\phi2)$$

and $$Eb=\exp(-i\phi1)-\exp(-i\phi2)$$

After some algebra, the two fields can be rewritten as:

$$Ea=2\cos[-(\phi1-\phi2)/2]\exp[-i(\phi1+\phi2)/2]$$

$$Eb=-2\sin[-(\phi1-\phi2)/2]\exp[-i(\phi1+\phi2)/2]$$

The key result from the above analysis is that the output waveform from the interferometer depends on the phase difference between the two arms. In contrast, the overall phase shift, and therefore the dispersion property, depends on the sum of the two phase functions. In mathematical terms:

Waveform $\propto \cos[-(\phi1-\phi2)/2]^2$ or $\sin[-(\phi1-\phi2)/2]^2$

Group Delay $\propto d(\phi1+\phi2)/df$

Dispersion $\propto d^2(\phi1+\phi2)/df^2$

Figure 8:
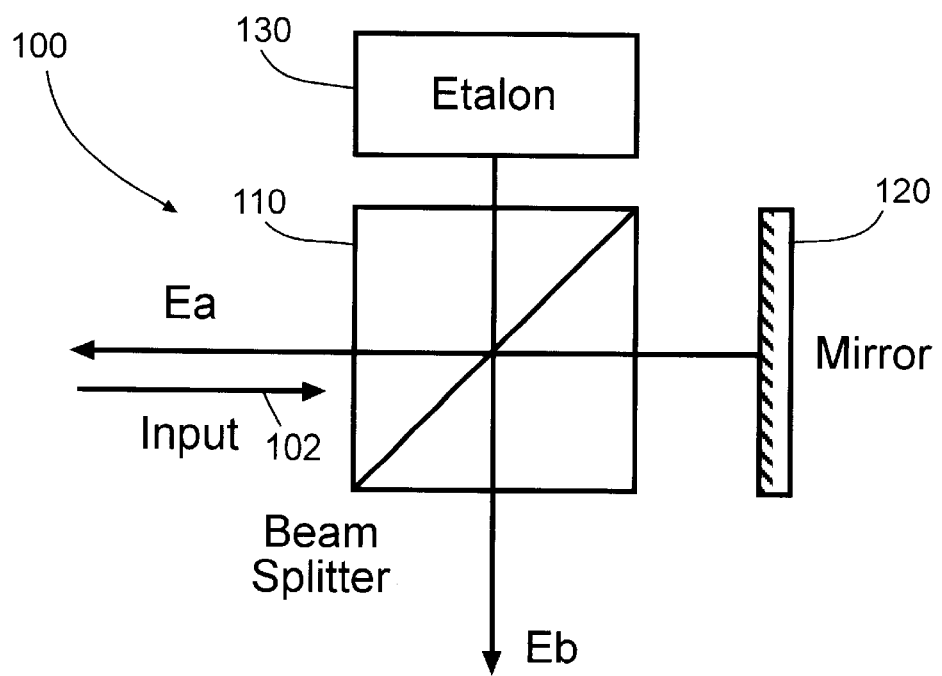
FIG. 8 illustrates a block diagram of a Michelson interferometer with a resonator.

FIG. 8 shows an interferometer 100 in which an input signal 102 is split into two beams by a beamsplitter 110. One beam propagates toward a mirror 120 and is reflected back by this mirror 120 toward the beamsplitter 110. The other beam propagates toward a resonator 130 and is also reflected back toward the beamsplitter 110. The resonator 130 is a cavity with a partially-reflective front mirror and a totally-reflective back mirror, as shown for example in FIGS. 3 and 4. The resonator 130 reflects back substantially all of the incident optical power regardless of wavelength, but the group delay of the reflected light is strongly dependent on wavelength. The two reflected beams from the mirror 120 and from the resonator 130 interfere at the beamsplitter 110 and the resulting output is split into two output signals, one at output Ea, and the other in a different direction at output Eb. The two output signals contain complementary subsets of the input spectral band. The two output ports Ea and Eb divide the spectral space evenly with alternating optical channels being directed to each output port (i.e., odd optical channels 1, 3, 5, 7, etc. are directed to output port Ea, while even channels 2, 4, 6, etc. are directed to output port Eb). Such a device concept has been proposed by B. B. Dingle and M. Izutsu, "Multifunction Optical Filter With A Michelson-Gires-Tournois Interferometer For Wavelength-Division-Multiplexed Network System Applications," *Optics Letters*, vol. 23, p. 1099(1998) and the references therein.

Figure 9:
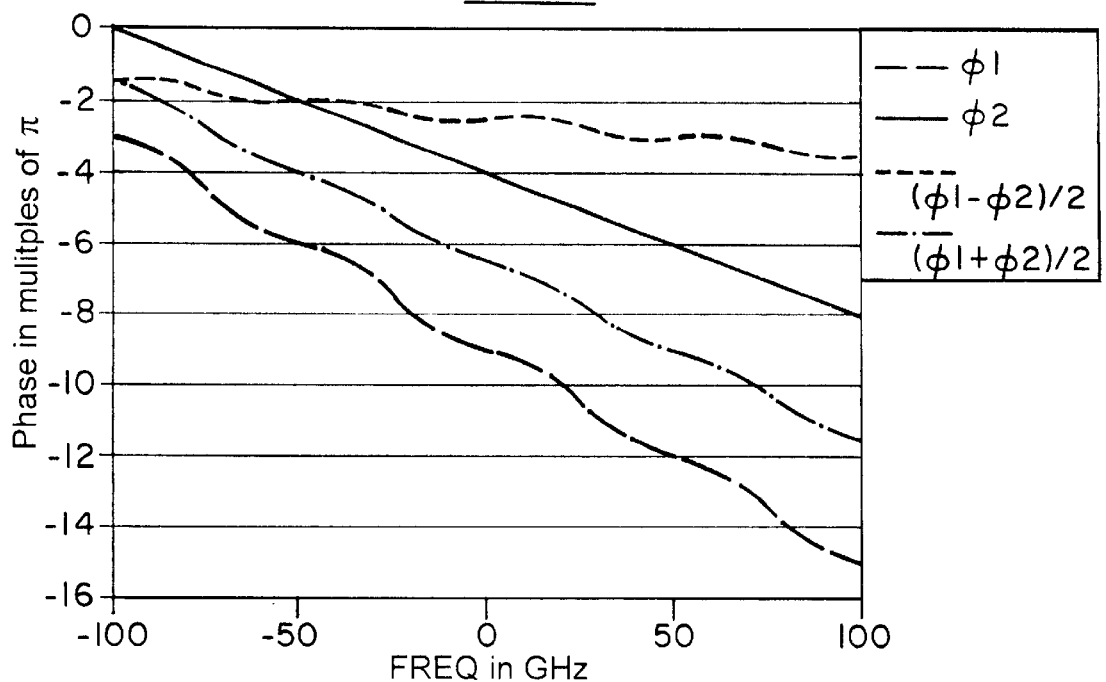
FIG. 9 illustrates the phase functions for the two arms of the interferometer illustrated in FIG. 8.
Figure 10:
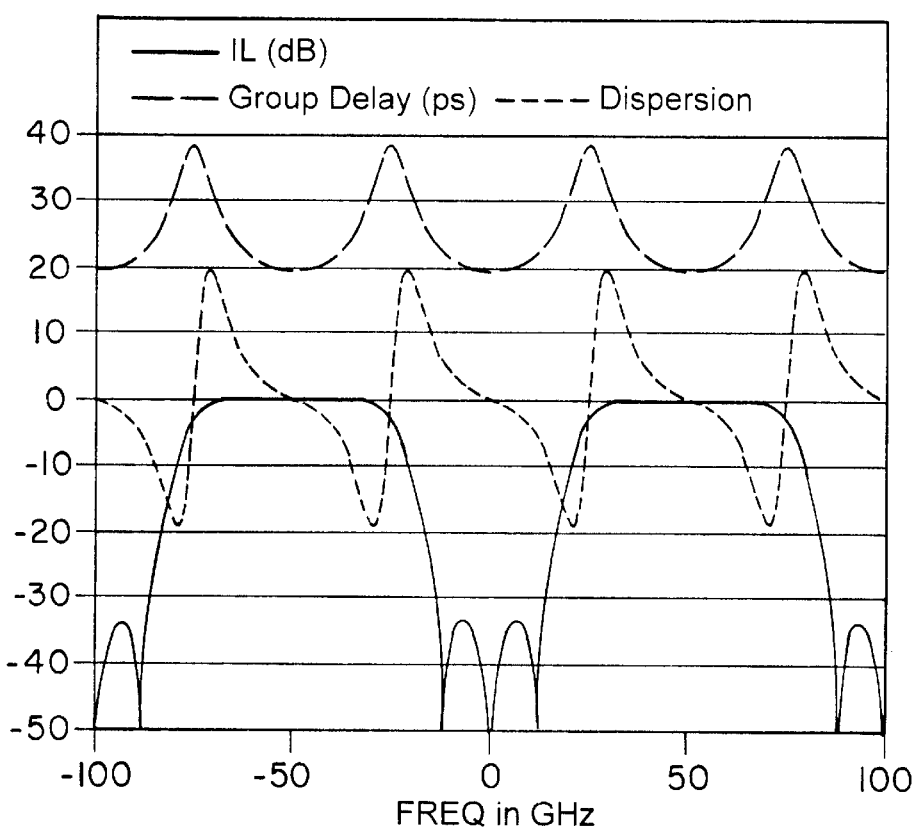
FIG. 10 illustrates the waveform, group delay, and dispersion of the interferometer illustrated in FIG. 8.

FIG. 9 shows the corresponding phase functions of the two arms of the interferometer 100. ϕ1 is the phase function of the resonator arm and ϕ2 is the phase function (i.e., a straight line) of the mirror arm. The phase difference shows a step-like behavior with a distance of π between successive flat regions. This explains why the waveform is the flat-topped shape shown in FIG. 10. However, the sum of the phase functions has significant curvature and therefore the dispersion is high, as illustrated in FIG. 10.

In contrast to FIG. 9, FIG. 5 shows the two phase functions ϕ1 and ϕ2 of the two arms in wavelength router 10. The "bending", or nonlinear behavior, of the two phase functions are caused by the resonators 30a and 30b respectively. It can be seen that the bending direction of both the phase functions reverse themselves every 25 GHz. Since the resonators 30a and 30b have a center frequency difference of 25 GHz, the two phase functions φ1 and φ2 have opposite bending directions at any given frequency. The summation of the two phase functions cancel each other's non-linearity, therefore (φ1+φ2) has nearly linear characteristics as shown in FIG. 5. From the previously stated properties of the interferometer 100, an almost linear (φ1+φ2) function gives low chromatic dispersion. It is equally important to note that the difference of φ1 and φ2 remains a step-like function as shown in FIG. 5. As a result, the output waveform has flat passband and good isolation. The corresponding waveform, group delay, and dispersion of one of the two output ports are illustrated in FIG. 6. Note that the group delay and dispersion values in FIG. 6 are much smaller compared to the values shown in FIG. 10.

The previous discussion shows a step-by-step construction of a wavelength router 10 that performs dispersion-compensation. This is done to give a quantitative example of router 10. Other channel spacings (e.g., ranging from 12.5 GHz to 100 GHz) can be implemented by changing d1, d2, and ΔL in the spirit described above. By varying the resonator reflectivities r1 and r2, devices with a passband shape and dispersion different from those of FIG. 6 can also be obtained. A technical advantage of router 10 is that no matter what reflectivities r1 and r2 are chosen for resonators 30a and 30b, the waveform is approximately symmetric. This means that the waveform of one output signal has about the same shape as that of the other output signal. The two output waveforms are shifted from each other in wavelength, since they are complimentary to each other in wavelength space.

In contrast to interferometer 100 illustrated in FIG. 8, wavelength router 10 performs a multiplexing and/or demultiplexing function with very low chromatic dispersion by employing a structure in which the phase difference function remains step-like, but the phase summation function becomes approximately linear with frequency. As a result, the waveform has a flat-top passband, good isolation, and dispersion is small.

As is evident in FIG. 5, the phase functions φ1 and φ2 have opposite bending characteristics, so their difference forms a step-like curve which gives rise to a flat-top waveform. However, because of the opposite bending characteristics of these phase functions, the sum of the two functions approximates a straight line and thereby results in low dispersion.

Figure 11:
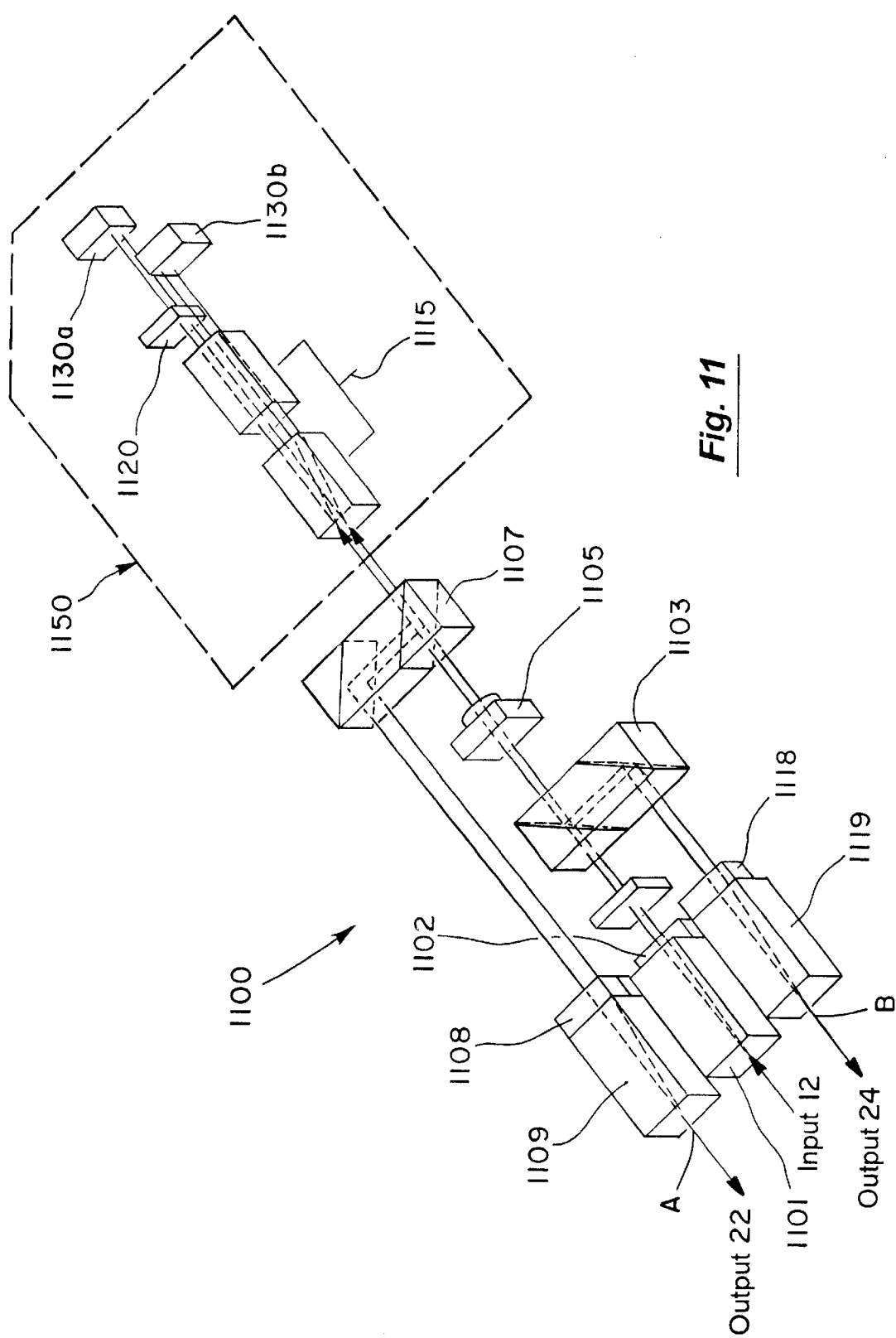
FIG. 11 illustrates another embodiment of the optical wavelength router according to the present invention.

FIG. 11 illustrates another embodiment of an optical wavelength router 1100. The input signal 12 initially passes through a beam displacer 1101 which comprises, for example, a birefringent element made from a material such as calcite, rutile, lithium niobate, YVO$_4$-based crystals, and the like. Beam displacer 1101 splits the input signal 12 into two beams having orthogonal polarizations (e.g., along the X and Y directions, respectively). A polarization rotator 1102 (e.g., a half-wave plate) rotates the polarization of one of the beams by 90 degrees, so that both beams have substantially the same polarization. The beam pair then passes through a polarized beamsplitter (PBS) 1103.

The beams are then incident onto a non-reciprocal element, such as a Faraday rotator 1105, which is used to separate the back-propagating beams from the polarized input beams propagating in the forward direction. Referring to FIGS. 12A and 12B, the Faraday rotator 1105 may be a magneto-optic element such as a doped garnet crystal 1201 (e.g., YIG) bonded to a half-wave plate 1202. The crystal 1201 rotates the input polarization by 45 degrees and the half-wave plate 1202 has its optical axis at 22.5 degrees.

Thus, the Faraday rotator 1105 transmits light in the forward direction without changing its polarization, as shown in FIG. 12A, but rotates the polarization of any light from the opposite direction by a predetermined degree (e.g., 90 degrees), as shown in FIG. 12B. Referring back to FIG. 11, the Faraday rotator 1105 transmits the polarized input beam pair in the forward direction without changing their polarization, but rotates the polarization of the reflected beam pair from the opposite direction by 90 degrees.

The input beam pair exiting the Faraday rotator 1105 in the forward direction then passes through a second PBS 1107. A zero-order beam displacer 1115 splits the beams into two pair of orthogonally-polarized beams. Various embodiments of a zero-order beam displacer 1115 are described in U.S. patent application Ser. No. 09/547,812, which is incorporated herein by reference. A first pair of beams having a common polarization passes through a delay element 1120, such as a block of glass having a predetermined thickness, and is then reflected back by a resonator 1130a. A second pair of beams having a polarization orthogonal to that of the first pair of beams is reflected back by a resonator 1130b. Resonators 1130a and 1130b may comprise the same type of resonators as resonators 30a and 30b described above. The resonators 1130a and 1130b reflect back substantially all of the incident optical power regardless of wavelength, but the group delay of the reflected light is strongly dependent on wavelength.

The two pairs of reflected beams from the resonators 1130a–b are recombined by back-propagation through the beam displacer 1115 and interfere to produce one beam pair again. Due to the birefringence of the beam displacer 1115, a difference in the optical path lengths between the two beam pairs is generated. As a result, the polarization state of the back-propagating beam pair exiting the beam displacer 1115 is a function of optical wavelength. In other words, this back-propagating beam pair has mixed polarization as a function of the optical wavelengths carried by the beams.

The second PBS 1107 splits this beam pair into two orthogonal polarizations. One polarization component of each beam is reflected by the second PBS 1107 and is directed toward output port A. In particular, one of the beams reflected by the second PBS 1107 passes through a polarization rotator 1108 (e.g., a half-wave plate), which rotates the beam polarization by 90 degrees so that the beam pair entering the birefringent element 1109 are orthogonally polarized. The birefringent element 1109 associated with output port A combines these orthogonally-polarized beams to produce an output signal 22 containing a predetermined subset of the input spectral band.

The other polarization component of each beam is transmitted through the second PBS 1107 toward the Faraday rotator 1105 along the same optical paths as the polarized input beams, but in the opposite direction. The polarization of the beam pair from the second PBS 1107 is rotated by 90 degrees by the Faraday rotator 1105, as previously discussed, so that they will be separated from the polarized input beams and reflected by the first PBS 1103 toward output port B. One of the beams reflected by the first PBS 1103 passes through a polarization rotator 1118 (e.g., a half-wave plate), which rotates the beam polarization by 90 degrees so that the beam pair entering the birefringent element 1119 are orthogonally polarized. The birefringent element 1119 associated with output port B combines these orthogonally-polarized beams to produce an output signal 24 containing a complementary subset of the input spectral beam.

Figure 13:
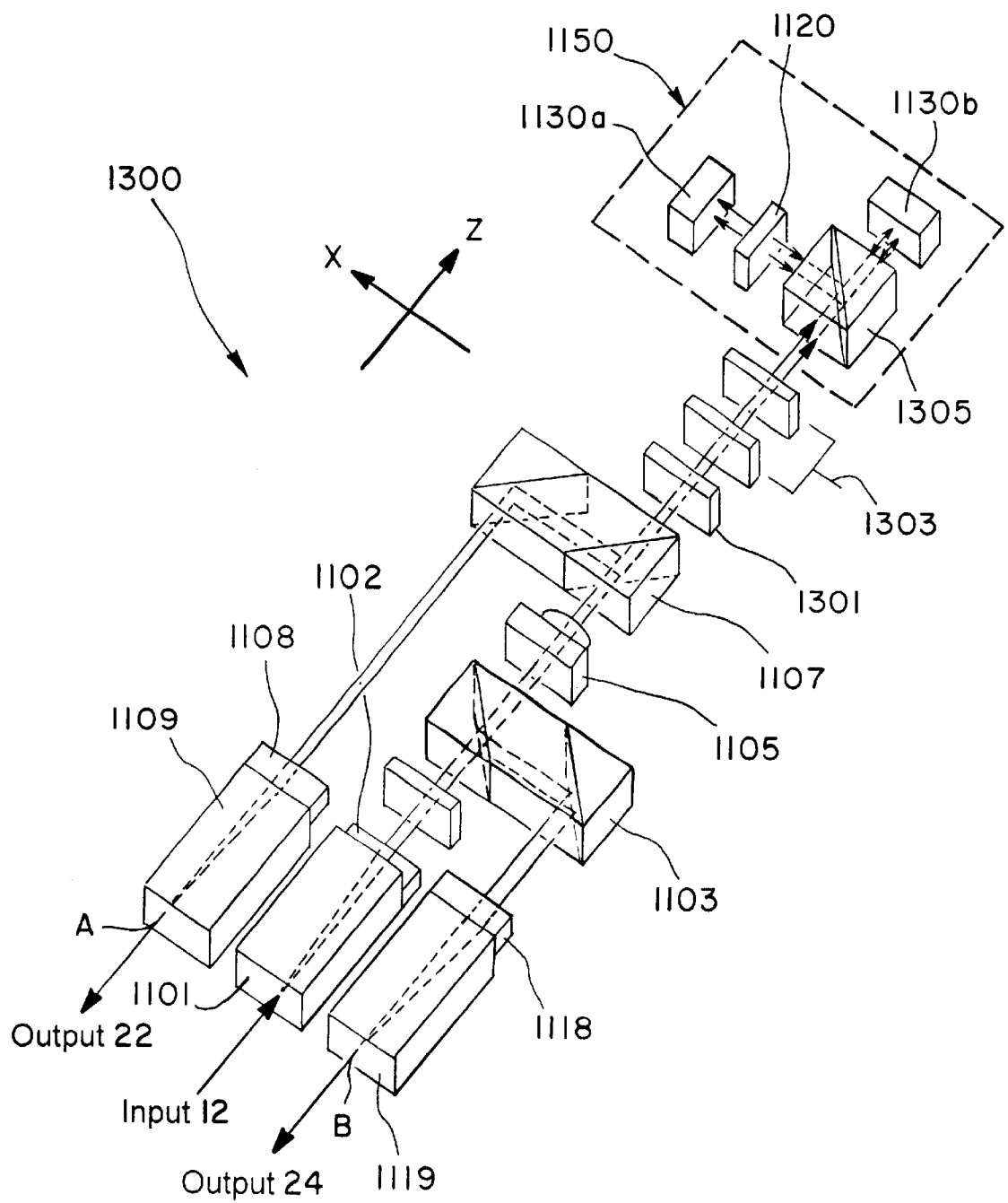
FIG. 13 illustrates yet another embodiment of the optical wavelength router according to the present invention.

FIG. 13 illustrates yet another embodiment of an optical wavelength router 1300 according to the present invention.

A portion of router 1300 is similar to that of router 1100. Those elements of router 1300 that differ from those of router 1100 will be described in further detail. After the second PBS 1107, the beam pair is horizontally polarized along the X axis. A half-wave plate 1301 with its optical axis at 22.5 degrees from the X axis rotates the polarization of the beam pair by 45 degrees. A third PBS 1305 splits both beams into two different paths. The horizontally polarized components of the beam pair are transmitted through the third PBS 1305 and are reflected by the resonator 1130*b*, as previously described. The vertically polarized components of the beam pair are reflected by the third PBS 1305. They pass through the delay element 1120 and are reflected back by resonator 1130*a*. The remainder of this embodiment operates in a manner similar to the embodiment shown in FIG. 11. If desired, one or more waveplates 1303 with optical axes at 45 degrees to the X axis can be inserted between the second PBS 1107 and the third PBS 1305 to allow fine tuning (e.g., by angle) of the interferometer's path length.

In operation of wavelength routers 1100 and 1300 implementing a multiplexing function, each of birefringent elements 1109 and 1119 receives an input signal and splits each respective input signal into beam pairs having orthogonal polarizations. Polarization rotator 1108 rotates one of the beam polarizations of a first beam pair so that both components of the first beam pair have the same polarization. Polarization rotator 1118 rotates one of the beam polarizations of a second beam pair so that both components of the second beam pair have the same polarization. The polarization of the second beam pair may or may not be the same as that of the first beam pair. PBS 1103 directs the second beam pair toward Faraday rotator 1105. When routers 1100 and 1300 perform a multiplexing function, the position of rotator 1105 is reversed to the position of rotator 1105 when routers 1100 and 1300 are performing the demultiplexing function described above with regard to FIGS. 11–13. The first beam pair and the second beam pair interfere and combine at PBS 1107 to produce one beam pair.

Referring to FIG. 11, zero-order beam displacer 1115 of wavelength router 1100 splits the beams into two pair of orthogonally-polarized beams. One pair of orthogonally-polarized beams passes through delay element 1120 and is then reflected back by a resonator 1130*a*. The other beam pair is reflected back by a resonator 1130*b*. The resonators 1130*a* and 1130*b* reflect substantially all of the incident optical power back regardless of wavelength, but the group delay of the reflected light is strongly dependent on wavelength.

The two pairs of reflected beams from the resonators 1130*a–b* are recombined by back-propagation through the beam displacer 1115 and interfere to produce one beam pair again. Due to the birefringence of the beam displacer 1115, a difference in the optical path lengths between the two beam pairs is generated. As a result, the polarization state of the back-propagating beam pair exiting the beam displacer 1115 is a function of optical wavelength. In other words, this back-propagating beam pair has mixed polarization as a function of the optical wavelengths carried by the beams.

Referring to FIG. 13, after passing through PBS 1107, the beam pair is horizontally polarized along the X axis. Half-wave plate 1303 with its optical axis at 22.5 degrees from the X axis rotates the polarization of the beam pair by 45 degrees. PBS 1305 splits both beams into two different paths. The horizontally polarized components of the beam pair are transmitted through PBS 1305 and are reflected by the resonator 1130*b*, as previously described. The vertically polarized components of the beam pair are reflected by PBS 1305 and pass through the delay element 1120 after which they are reflected back by resonator 1130*a*. The two pairs of reflected beams from the resonators 1130*a–b* are recombined by back-propagation through the PBS 1305 and interfere to produce one beam pair again. If desired, one or more waveplates 1301 with optical axes at 45 degrees to the X axis can be inserted between the second PBS 1107 and the third PBS 1305 to allow fine tuning (e.g., by angle) of the interferometer's path length.

In both wavelength router 1100 and 1300, PBS 1107, rotator 1105 and PBS 1103 direct the back-propagating beam pair to birefringent element 1101. The polarization of one component of the beam pair is rotated by ninety degrees by polarization rotator 1102 so that the beam pair entering the birefringent element 1101 is orthogonally polarized. Birefringent element 1101 combines these orthogonally polarized beams to produce a multiplexed output signal.

It should be understood that the use of resonators 1130*a* and 1130*b* in wavelength routers 1100 and 1300 results in low chromatic dispersion, as described above with regard to wavelength router 10. Therefore, the performance characteristics illustrated in FIGS. 5 and 6 with regard to wavelength router 10 generally apply to wavelength routers 1100 and 1300 as well. As a result, routers 1100 and 1300 comprise alternative embodiments of router 10, but each of routers 10, 1100, and 1300 performs demultiplexing and/or multiplexing functions while achieving low chromatic dispersion.

Figure 14:
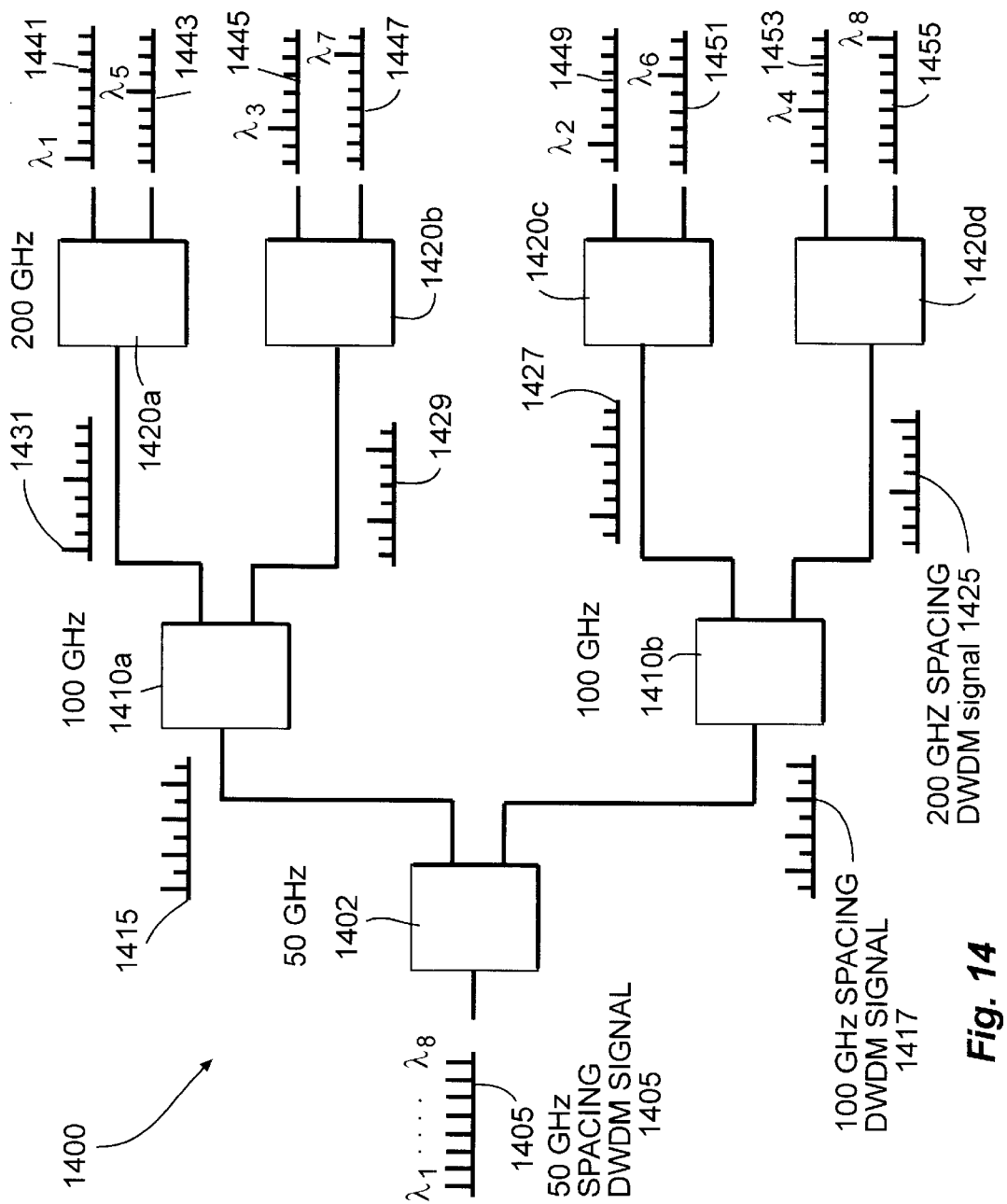
FIG. 14 illustrates a cascaded architecture of optical wavelength routers.

FIG. 14 illustrates a cascaded architecture 1400 of optical filters. For example, a first stage of architecture 1400 may include an optical filter 1402. A second stage of architecture 1400 may include optical filters 1410*a* and 1410*b*, which are collectively referred to as optical filters 1410. Third stage of architecture 1400 may include optical filters 1420*a*, 1420*b*, 1420*c*, and 1420*d*, which are collectively referred to as optical filters 1420. Optical filters 1402, 1410, and 1420 may comprise any combination and arrangement of optical filters that employ any suitable conventional optical filtering technology (e.g., fiber bragg gratings, thin film filters, arrayed waveguide grating, etc.) and optical wavelength routers 10, 1100, and 1300 described above.

In the particular embodiment illustrated in FIG. 14, filter 1402 comprises a 50 GHz optical router 10 that receives a 50 GHz spaced dense wavelength division multiplexed (DWDM) signal 1405 and generates an odd-channel 100 GHz spacing DWDM signal 1415 and an even channel 100 GHz spacing signal 1417. Two 100 GHz filters 1410*a* and 1410*b* are used to produce a 200 GHz spaced signal 1431 carrying wavelengths $\lambda_1$ and $\lambda_5$, a signal 1429 carrying wavelengths $\lambda_3$ and $\lambda_7$, a signal 1427 carrying wavelengths $\lambda_2$ and $\lambda_6$, and a signal 1425 carrying wavelengths $\lambda_4$ and $\lambda_8$. A third stage of filters 1420*a–d* are used to produce the individual channels $\lambda_1$ through $\lambda_8$ on outputs 1441, 1449, 1445, 1453, 1443, 1451, 1447, and 1455 respectively. Signals 1415, 1417, 1425, 1427, 1429, and 1431 may be referred to as intermediate input signals and/or intermediate output signals with respect to a particular filter 1402, 1410, or 1420. By using one or more optical wavelength routers 10, 1100, and 1300 in the cascaded architecture 1400, the device significantly reduces chromatic dispersion while keeping a flat-top passband for each channel and good isolation among channels.

Although FIG. 14 illustrates architecture 1400 having three stages of filters to demultiplex a DWDM signal 1405 having eight wavelength channels, it is contemplated that architecture 1400 may have any suitable number of stages to demultiplex a DWDM signal 1405 having any suitable number of wavelength channels. Moreover, FIG. 14 is detailed with respect to demultiplexing a 50 GHz spaced DWDM signal 1405 for illustrative purposes only. It is contemplated that a DWDM signal 1405 having any suitable channel spacing (12.5 GHz, 50 GHz, 100 GHz, 200 GHz, etc.) may be processed by the architecture 1400 of filters. Additionally, although the description of architecture 1400 is detailed with respect to a demultiplexing function, it should be understood that it can also perform a multiplexing function upon individual wavelength channels to produce one or more DWDM signals while achieving low chromatic dispersion.

Figure 15:
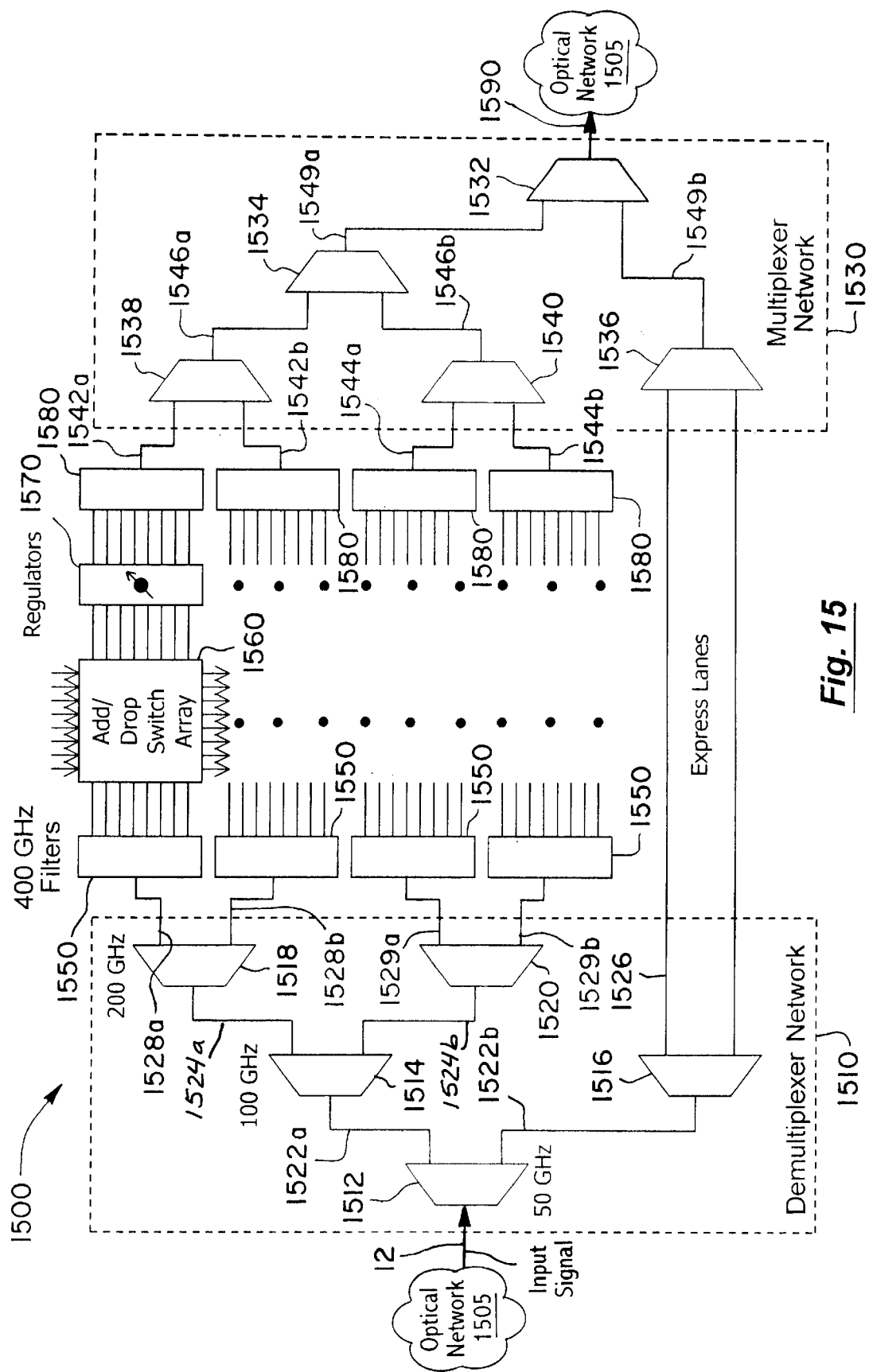
FIG. 15 illustrates an optical networking architecture using the optical wavelength routers.

FIG. 15 illustrates one embodiment of an optical networking architecture 1500 that includes an optical network 1505 coupled to a demultiplexer network 1510, filters 1550, switch fabrics 1560, regulators 1570, filters 1580, and a multiplexer network 1530. In general, optical wavelength routers 10, 1100, and/or 1300 may be incorporated into architecture 1500, such as in demultiplexer network 1510 and/or multiplexer network 1530, to compensate for chromatic dispersion. It should be understood that architecture 1500 may be configured differently and/or may include additional or fewer components without departing from the scope of the present invention.

Optical network 1505 comprises any combination and arrangement of routers, bridges, hubs, gateways, switches, multiplexers, demultiplexers, transmitters, amplifiers, receivers, couplers, isolators, circulators, filters, detectors, wavelength converters, add/drop devices, or any other appropriate optical networking components. Optical network 1505 may include portions of a long-haul network, a metropolitan network, and/or a local/access network.

Demultiplexer network 1510 and multiplexer network 1530 each comprise an appropriate arrangement of filters. For example, demultiplexer network 1510 comprises filters 1512, 1514, 1516, 1518, and 1520. One or more of filters 1512–1520 may comprise a wavelength router 10, 1100, and/or 1300 to perform a demultiplexing function while compensating for chromatic dispersion. Similarly, multiplexer network 1530 may comprise filters 1532, 1534, 1536, 1538, and 1540. One or more of filters 1532–1540 may comprise a wavelength router 10, 1100, and/or 1300 to perform a multiplexing function while compensating for chromatic dispersion.

Filters 1550 and 1580 comprise gratings, Bragg gratings, Fiber gratings, Fiber Bragg gratings, Fabry-Perot filters, Thin-Film filters, interferometers, arrayed waveguide gratings, tunable filters, or any other optical device that process and differentiate among optical signals based upon wavelength.

Switch fabrics 1560 comprise switches and/or routers. In one embodiment switch fabrics 1560 comprise add/drop switch arrays. Various embodiments of an add/drop switch array are disclosed in U.S. patent application Ser. No. 09/273,920, which is incorporated herein by reference. Regulators 1570 comprise any suitable device that adjustably regulate the optical power level of an optical channel.

In operation, demultiplexer network 1510 receives input signal 12 from network 1505. Demultiplexer network 1510 and filters 1550 separate input signal 12 into an array of spatially separated wavelength channels. This is generally done by progressively demultiplexing input signal 12 into intermediate signals, such as, for example, intermediate signals 1522*a–b*, 1524*a–b*, 1526, 1528*a–b*, and 1529*a–b* which may be referred to as intermediate input signals and/or intermediate output signals with respect to a particular filter 1512, 1514, 1516, 1518, and 1520. By using one or more optical routers 10, 1100, and/or 1300 in demultiplexer network 1510, each spatially separated wavelength channel generally has a flat-top passband, good isolation from other channels, and low chromatic dispersion. Switch fabrics 1560 process the spatially separated channels to perform a switching and/or routing function. In a particular embodiment, a switch fabric 1560 may comprise an add/drop switch array that selectively routes channels from the input ports to its drop ports; substitutes channels from the add ports in place of the dropped channels; and routes the remaining input channels and the added channels to the output ports of the add/drop switch array. This combination of demultiplexer network 1510, filters 1550 and add/drop switch arrays 1560 allows any combination of input channels to be replaced with any combination of add channels.

In one embodiment, the array of output channels from the switch fabrics 1550 pass through regulators 1570 which adjustably regulate the optical power level of each channel. In a particular embodiment, a selected subset of the channels associated with input signal 12 pass directly from demultiplexer network 1510 to multiplexer network 1530 in "express lanes." A second array of filters 1580 and a multiplexing network 1530 combine the output channels so that they can be transmitted as a DWDM output signal 1590. This is generally done by progressively multiplexing into output signal 1590 intermediate signals, such as, for example, intermediate signals 1542*a–b*, 1544*a–b*, 1546*a–b*, 1548, and 1549*a–b* which may be referred to as intermediate input signals and/or intermediate output signals with respect to a particular filter 1532, 1534, 1536, 1538, and 1540. By using one or more optical routers 10, 1100, and/or 1300 in multiplexer network 1530, the wavelength channels comprising output signal 1590 generally have low chromatic dispersion.

The above disclosure sets forth a number of embodiments of the present invention. Other arrangements or embodiments, not precisely set forth, could be practiced under the teachings of the present invention and as set forth in the following claims.

What is claimed is:

1. An optical wavelength router comprising:
   a beamsplitter that separates an input signal into a first beam and a second beam;
   a first resonator that reflects the first beam, the first resonator having a first center wavelength; and
   a second resonator that reflects the second beam, the second resonator having a second center wavelength wherein the second center wavelength is offset relative to the first center wavelength by approximately one half of the free spectral range of the first resonator such that the resonance frequencies of the second resonator are matched to the anti-resonance frequencies of the first resonator.

2. The router of claim 1, wherein the beamsplitter processes the first beam and the second beam to generate a first output signal for communication to a first output port and to generate a second output signal for communication to a second output port, the first output signal comprising a first subset of channels from the input signal and the second output signal comprising a second subset of channels from the input signal.

3. The router of claim 2, wherein:
   the input signal comprises an input spectral band;
   the first output signal comprises a first subset of the input spectral band; and
   the second output signal comprises a second subset of the input spectral band that is complementary to the first subset of the input spectral band.

4. The router of claim 3, wherein:
the input signal comprises a WDM signal comprising a plurality of channels;
the first subset of the input spectral band comprises even channels; and
the second subset of the input spectral band comprises odd channels.

5. The router of claim 2, further comprising a demultiplexer operable to process the first output signal to produce a third output signal and a fourth output signal, wherein the third output signal comprises a third subset of channels and the fourth output signal comprises a fourth subset of channels.

6. The router of claim 5, wherein a plurality of transmission peaks associated with the first subset of channels are flatter than a plurality of transmission peaks associated with at least the third subset of channels.

7. The router of claim 5, wherein a plurality of transmission peaks associated with the first subset of channels exhibit higher isolation than a plurality of transmission peaks associated with at least the third subset of channels.

8. The router of claim 5, wherein the demultiplexer comprises a selected one of an arrayed waveguide device, a diffraction grating device, a fiber Bragg grating device, a thin-film interference filter, or a polarization-based demultiplexing device.

9. The router of claim 1, wherein:
the input signal comprises a first input signal;
the beamsplitter separates a second input signal into a third beam and a fourth beam;
the first resonator reflects the third beam;
the second resonator reflects the fourth beam;
the beamsplitter processes the first beam, the second beam, the third beam, and the fourth beam to generate an output signal for communication to an output port; and
the output signal comprises channels of the first input signal combined with channels of the second input signal.

10. The router of claim 9, further comprising a multiplexer operable to multiplex a plurality of input signals to produce the first input signal.

11. The router of claim 10, wherein the multiplexer comprises a selected one of an arrayed waveguide device, a diffraction grating device, a fiber Bragg grating device, a thin-film interference filter, or a polarization-based multiplexing device.

12. The router of claim 10, wherein a plurality of transmission peaks associated with the output signal are flatter than a plurality of transmission peaks associated with the first input signal.

13. The router of claim 1, wherein the first resonator comprises a Gires-Tournois resonator.

14. The router of claim 1, wherein the second resonator comprises a Gires-Tournois resonator.

15. The router of claim 1, wherein:
the first resonator has a partially reflective front surface and a highly reflective back surface spaced a first optical thickness from the front surface;
the second resonator has a partially reflective front surface and a highly reflective back surface spaced a second optical thickness from the front surface; and
the difference between the optical thicknesses of the first and second resonators is approximately equal to one-quarter wavelength.

16. The router of claim 15, wherein the first optical thickness produces a desired center frequency and free-spectral range such that even channels in the input signal are included in a first output signal and odd channels in the input signal are included in a second output signal.

17. The router of claim 1, wherein:
the first resonator has a partially reflective front surface and a highly reflective back surface spaced a first optical thickness from the front surface;
the second resonator has a partially reflective front surface and a highly reflective back surface spaced a second optical thickness from the front surface;
the first beam propagates along an optical path having a first optical path length;
the second beam propagates along an optical path having a second optical path length; and
the difference between the first optical path length and the second optical path length is approximately equal to one half of the first optical thickness.

18. The router of claim 1, wherein the beamsplitter comprises a thin film beamsplitter.

19. The router of claim 1, wherein:
the input signal comprises a pair of polarized beams; and
the beamsplitter comprises a polarization beamsplitter that:
separates the input signal into two pair of orthogonally polarized beams such that the first resonator reflects a first pair of beams having the a common polarization and the second resonator reflects a second pair of beams having a common polarization; and
generates an output signal using the first pair of beams reflected by the first resonator and the second pair of beams reflected by the second resonator, the output signal comprising a pair of polarized beams.

20. The router of claim 19, wherein the beamsplitter comprises a first beamsplitter and the router further comprises a second beamsplitter operable to:
direct a first subset of channels from the output signal to a first output port; and
direct a second subset of channels from the output signal to a second output port.

21. The router of claim 20, wherein:
the input signal comprises an input spectral band;
the first subset of channels from the output signal comprises a first subset of the input spectral band; and
the second subset of channels from the output signal comprises a second subset of the input spectral band.

22. The router of claim 21, wherein:
the input signal comprises a WDM signal comprising a plurality of channels;
the first subset of the input spectral band comprises even channels; and
the second subset of the input spectral band comprises odd channels.

23. The router of claim 19, wherein the beamsplitter comprises a first beamsplitter and the input signal comprises a first input signal and a second input signal, the router further comprising a second beamsplitter operable to:
receive the first input signal from a first input port;
receive the second input signal from a second input port; and
generate the input signal communicated to the first beamsplitter using the first input signal and the second input signal.

24. The router of claim 19, wherein the polarization beamsplitter comprises a zero-order beam displacer.

25. The router of claim 1, wherein the beamsplitter comprises a diffractive optical element.

26. The router of claim 1, wherein the beamsplitter comprises an optical coupler.

27. The router of claim 1, wherein:
the first resonator is positioned at a first bias angle with respect to the normal of the optical path of the first beam; and
the second resonator is positioned at a second bias angle with respect to the normal of the optical path of the second beam.

28. The router of claim 27, wherein the first bias angle substantially equals the second bias angle.

29. An optical wavelength router comprising:
a beamsplitter that separates an input signal into a first beam and a second beam;
a first resonator that reflects the first beam and having a partially reflective front surface and a highly reflective back surface spaced a first optical thickness from the front surface; and
a second resonator that reflects the second beam and having a partially reflective front surface and a highly reflective back surface spaced a second optical thickness from the front surface;
wherein the difference between the optical thicknesses of the first and second resonators is approximately equal to one-quarter wavelength.

30. The router of claim 29, wherein the beamsplitter is further operable to process the first beam and the second beam to generate a first output signal for communication to a first output port and to generate a second output signal for communication to a second output port, the first output signal comprising a first subset of channels from the input signal and the second output signal comprising a second subset of channels from the input signal.

31. The router of claim 30, wherein:
the input signal comprises an input spectral band;
the first output signal comprises a first subset of the input spectral band; and
the second output signal comprises a second subset of the input spectral band that is complementary to the first subset of the input spectral band.

32. The router of claim 31, wherein:
the input signal comprises a WDM signal comprising a plurality of channels;
the first subset of the input spectral band comprises even channels; and
the second subset of the input spectral band comprises odd channels.

33. The router of claim 30, further comprising a demultiplexer operable to process the first output signal to produce a third output signal and a fourth output signal, wherein the third output signal comprises a third subset of channels and the fourth output signal comprises a fourth subset of channels.

34. The router of claim 33, wherein a plurality of transmission peaks associated with the first subset of channels are flatter than a plurality of transmission peaks associated with at least the third subset of channels.

35. The router of claim 33, wherein a plurality of transmission peaks associated with the first subset of channels exhibit higher isolation than a plurality of transmission peaks associated with at least the third subset of channels.

36. The router of claim 31, wherein the demultiplexer comprises a selected one of an arrayed waveguide device, a diffraction grating device, a fiber Bragg grating device, a thin-film interference filter, or a polarization-based demultiplexing device.

37. The router of claim 29, wherein:
the input signal comprises a first input signal;
the beamsplitter separates a second input signal into a third beam and a fourth beam;
the first resonator reflects the third beam;
the second resonator reflects the fourth beam;
the beamsplitter processes the first beam, the second beam, the third beam, and the fourth beam to generate an output signal for communication to an output port; and
the output signal comprises channels of the first input signal combined with channels of the second input signal.

38. The router of claim 37, further comprising a multiplexer operable to multiplex a plurality of input signals to produce the first input signal.

39. The router of claim 38, wherein the multiplexer comprises a selected one of an arrayed waveguide device, a diffraction grating device, a fiber Bragg grating device, a thin-film interference filter, or a polarization-based multiplexing device.

40. The router of claim 38, wherein a plurality of transmission peaks associated with the output signal are flatter than a plurality of transmission peaks associated with the first input signal.

41. The router of claim 29, wherein the first resonator comprises a Gires-Toumois resonator.

42. The router of claim 29, wherein the second resonator comprises a Gires-Tournois resonator.

43. The router of claim 29, wherein:
the first resonator has a first center wavelength; and
the second resonator has a second center wavelength; and
the second center wavelength is offset relative to the first center wavelength by approximately one half of the free spectral range of the first resonator such that the resonance frequencies of the second resonator are matched to the anti-resonance frequencies of the first resonator.

44. The router of claim 29, wherein the first optical thickness produces a desired center frequency and free-spectral range such that even channels in the input signal are included in a first output signal and odd channels in the input signal are included in a second output signal.

45. The router of claim 29, wherein:
the first beam propagates along an optical path having a first optical path length;
the second beam propagates along an optical path having a second optical path length; and
the difference between the first optical path length and the second optical path length is approximately equal to one half of the first optical thickness.

46. The router of claim 29, wherein the beamsplitter comprises a thin film beamsplitter.

47. The router of claim 29, wherein:
the input signal comprises a pair of polarized beams; and
the beamsplitter comprises a polarization beamsplitter that:
separates the input signal into two pair of orthogonally polarized beams such that the first resonator reflects a first pair of beams having a common polarization and the second resonator reflects a second pair of beams having a common polarization; and generates an output signal using the first pair of beams reflected by the first resonator and the second pair of beams reflected by the second resonator, the output signal comprising a pair of polarized beams.

48. The router of claim 47, wherein the beamsplitter comprises a first beamsplitter and the router further comprises a second beamsplitter operable to:

direct a first subset of channels from the output signal to a first output port; and direct a second subset of channels from the output signal to a second output port.

49. The router of claim 48, wherein:

the input signal comprises an input spectral band;

the first subset of channels from the output signal comprises a first subset of the input spectral band; and the second subset of channels from the output signal comprises a second subset of the input spectral band.

50. The router of claim 49, wherein:

the input signal comprises a WDM signal comprising a plurality of channels;

the first subset of the input spectral band comprises even channels; and the second subset of the input spectral band comprises odd channels.

51. The router of claim 47, wherein the beamsplitter comprises a first beamsplitter and the input signal comprises a first input signal and a second input signal, the router further comprising a second beamsplitter operable to:

receive the first input signal from a first input port;

receive the second input signal from a second input port; and generate the input signal communicated to the first beamsplitter using the first input signal and the second input signal.

52. The router of claim 47, wherein the polarization beamsplitter comprises a zero-order beam displacer.

53. The router of claim 29, wherein the beamsplitter comprises a diffractive optical element.

54. The router of claim 29, wherein the beamsplitter comprises an optical coupler.

55. The router of claim 29, wherein:

the first resonator is positioned at a first bias angle with respect to the normal of the optical path of the first beam; and the second resonator is positioned at a second bias angle with respect to the normal of the optical path of the second beam.

56. The router of claim 55, wherein the first bias angle substantially equals the second bias angle.

57. A method for optical wavelength routing an input signal, comprising:

separating the input signal into a first beam and a second beam;

reflecting the first beam using a first resonator having a first center wavelength; and reflecting the second beam using a second resonator having a second center wavelength;

wherein the second center wavelength is offset relative to the first center wavelength by approximately one half of the free spectral range of the first resonator such that the resonance frequencies of the second resonator are matched to the anti-resonance frequencies of the first resonator.

58. The method of claim 57, wherein said separating the input signal is performed by a beamsplitter.

59. The method of claim 57, further comprising:

generating a first output signal for communication to a first output port using the first beam and the second beam; and generating a second output signal for communication to a second output port using the first beam and the second beam;

wherein the first output signal comprises a first subset of channels from the input signal and the second output signal comprises a second subset of channels from the input signal.

60. The method of claim 59, wherein:

the input signal comprises an input spectral band;

the first output signal comprises a first subset of the input spectral band; and the second output signal comprises a second subset of the input spectral band that is complementary to the first subset of the input spectral band.

61. The method of claim 59, wherein: the input signal comprises a WDM signal comprising a plurality of channels; the first subset of the input spectral band comprises even channels; and the second subset of the input spectral band comprises odd channels.

62. The method of claim 59, further comprising demultiplexing the first output signal to produce a third output signal and a fourth output signal, wherein the third output signal comprises a third subset of channels and the fourth output signal comprises a fourth subset of channels.

63. The method of claim 62, wherein a plurality of transmission peaks associated with the first subset of channels are flatter than a plurality of transmission peaks associated with at least the third subset of channels.

64. The method of claim 62, wherein a plurality of transmission peaks associated with the first subset of channels exhibit higher isolation than a plurality of transmission peaks associated with at least the third subset of channels.

65. The method of claim 62, wherein the step of demultiplexing is performed by a selected one of an arrayed waveguide device, a diffraction grating device, a fiber Bragg grating device, a thin-film interference filter, or a polarization-based demultiplexing device.

66. The method of claim 47, wherein the input signal comprises a first input signal, the method further comprising:

separating a second input signal into a third beam and a fourth beam;

reflecting the third beam using the first resonator;

reflecting the fourth beam using the second resonator; and generating an output signal for communication to an output port using the first beam, the second beam, the third beam, and the fourth beam, wherein the output signal comprises channels of the first input signal combined with channels of the second input signal.

67. The method of claim 66, further comprising multiplexing a plurality of input signals to produce the first input signal.

68. The method of claim 67, wherein the step of multiplexing is performed by a selected one of an arrayed waveguide device, a diffraction grating device, a fiber Bragg grating device, a thin-film interference filter, or a polarization-based multiplexing device.

69. The method of claim 67, wherein a plurality of transmission peaks associated with the output signal are flatter than a plurality of transmission peaks associated with the first input signal.

70. The method of claim 47, wherein:
the first resonator has a partially reflective front surface and a highly reflective back surface spaced a first optical thickness from the front surface;
the second resonator has a partially reflective front surface and a highly reflective back surface spaced a second optical thickness from the front surface; and
the difference between the optical thicknesses of the first and second resonators is approximately equal to one-quarter wavelength.

71. The method of claim 70, wherein the first optical thickness is selected to produce a desired center frequency and free-spectral range such that even channels in the input signal are included in a first output signal and odd channels in the input signal are included in a second output signal.

72. The method of claim 57, wherein:
the first resonator has a partially reflective front surface and a highly reflective back surface spaced a first optical thickness from the front surface;
the second resonator has a partially reflective front surface and a highly reflective back surface spaced a second optical thickness from the front surface;
the first beam propagates along an optical path having a first optical path length;
the second beam propagates along an optical path having a second optical path length; and
the difference between the first optical path length and the second optical path length is approximately equal to one half of the first optical thickness.

73. The method of claim 57, wherein:
the input signal comprises a pair of polarized beams; and
separating the input signal comprises separating the input signal into two pair of orthogonally polarized beams such that the first resonator reflects a first pair of beams having a common polarization and the second resonator reflects a second pair of beams having a common polarization;
the method further comprising generating an output signal using the first pair of beams reflected by the first resonator and the second pair of beams reflected by the second resonator, the output signal comprising a pair of polarized beams.

74. The method of claim 73, wherein the input signal comprises a first input signal and a second input signal, the method further comprising:
receiving the first input signal from a first input port;
receiving the second input signal from a second input port; and
generating the input signal using the first input signal and the second input signal prior to separating the input signal.

75. The method of claim 73, further comprising:
directing a first subset of channels from the output signal to a first output port; and directing a second subset of channels from the output signal to a second output port.

76. The method of claim 75, wherein:
the input signal comprises an input spectral band;
the first subset of channels from the output signal comprises a first subset of the input spectral band; and
the second subset of channels from the output signal comprises a second subset of the input spectral band.

77. The method of claim 76, wherein:
the input signal comprises a WDM signal comprising a plurality of channels;
the first subset of the input spectral band comprises even channels; and
the second subset of the input spectral band comprises odd channels.

78. The router of claim 57, wherein:
the first resonator is positioned at a first bias angle with respect to the normal of the optical path of the first beam; and
the second resonator is positioned at a second bias angle with respect to the normal of the optical path of the second beam.

79. The router of claim 78, wherein the first bias angle substantially equals the second bias angle.

* * * * *